(12) United States Patent
Sueda et al.

(10) Patent No.: US 9,120,681 B2
(45) Date of Patent: *Sep. 1, 2015

(54) METHOD FOR PRODUCTION OF ZINC OXIDE PARTICLES

(71) Applicant: Sakai Chemical Industry Co., Ltd., Sakai-shi, Osaka (JP)

(72) Inventors: Satoru Sueda, Iwaki (JP); Mitsuo Hashimoto, Iwaki (JP); Atsuki Terabe, Iwaki (JP); Nobuo Watanabe, Iwaki (JP); Koichiro Magara, Iwaki (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/062,354

(22) Filed: Oct. 24, 2013

(65) Prior Publication Data

US 2014/0112862 A1    Apr. 24, 2014

Related U.S. Application Data

(63) Continuation-in-part of application No. PCT/JP2012/061280, filed on Apr. 26, 2012, and a continuation-in-part of application No. PCT/JP2012/061281, filed on Apr. 26, 2012, and a continuation-in-part of application No. PCT/JP2012/061282, filed on Apr. 26, 2012.

(30) Foreign Application Priority Data

Apr. 28, 2011  (JP) ................................ 2011-101021
Apr. 28, 2011  (JP) ................................ 2011-101022
Apr. 28, 2011  (JP) ................................ 2011-101023

(51) Int. Cl.
*C01G 9/02* (2006.01)
*C09C 1/04* (2006.01)

(52) U.S. Cl.
CPC . *C01G 9/02* (2013.01); *C09C 1/043* (2013.01); *C01P 2002/72* (2013.01); *C01P 2004/03* (2013.01); *C01P 2004/04* (2013.01); *C01P 2004/20* (2013.01); *C01P 2004/54* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| 5,093,099 | A | 3/1992 | Haishi et al. | |
|---|---|---|---|---|
| 7,935,358 | B2 | 5/2011 | Sasaki et al. | |
| 8,642,018 | B2 | 2/2014 | Kurosawa et al. | |
| 2009/0014687 | A1* | 1/2009 | Kaskel et al. | 252/301.36 |
| 2009/0017303 | A1* | 1/2009 | Choy et al. | 428/402 |
| 2010/0074837 | A1* | 3/2010 | Shio et al. | 423/622 |
| 2010/0286322 | A1* | 11/2010 | Yabuki et al. | 524/432 |
| 2011/0081548 | A1 | 4/2011 | Sueda et al. | |
| 2011/0081550 | A1 | 4/2011 | Sueda et al. | |
| 2014/0058029 | A1 | 2/2014 | Sueda et al. | |

FOREIGN PATENT DOCUMENTS

| JP | H03-183620 A | 8/1991 |
|---|---|---|
| JP | H07-187673 A | 7/1995 |
| JP | H09-137152 A | 5/1997 |
| JP | H11-302015 A | 11/1999 |
| JP | 2001-163619 A | 6/2001 |
| JP | 2002194379 A | 7/2002 |
| JP | 2007-223874 A | 9/2007 |
| JP | 2008-254992 A | 10/2008 |
| JP | 2008-2308950 A | 10/2008 |
| JP | 2008-266445 A | 11/2008 |
| JP | 2009-029698 A | 2/2009 |
| WO | WO-2010/050430 A1 | 5/2010 |

OTHER PUBLICATIONS

Garcia, S.P., et al., "Controlling the Morphology of Zinc Oxide Nanorods Crystallized from Aqueous Solutions: The Effect of Crystal Growth Modifiers on Aspect Ratio", Chemistry of Materials, 2007, 19, pp. 4016-4022.
Paper of Meeting of Taiwanese Ceramic Society (Synthesis Technique of Advanced BaTiO3 Powders for High Capacity MLCC Products) in 2007, with partial English translation.
Guodong et al., "Study on Preparation and Method of Non-Aggregation Nanometer ZnO", China Ceramics, Term 4, vol. 39, Aug. 2003.

* cited by examiner

Primary Examiner — Steven Bos
(74) Attorney, Agent, or Firm — Novak Druce Connolly Bove + Quigg LLP

(57) ABSTRACT

It is an object of the present invention to provide a new method for production of zinc oxide particles which can control the particle diameter and particle shape of obtained zinc oxide particles by selecting suitable conditions, and can prepare zinc oxide applicable to various applications. A method for production of zinc oxide particles, comprising a step of aging a zinc oxide raw material in an aqueous zinc salt solution.

16 Claims, 15 Drawing Sheets

FIG.20

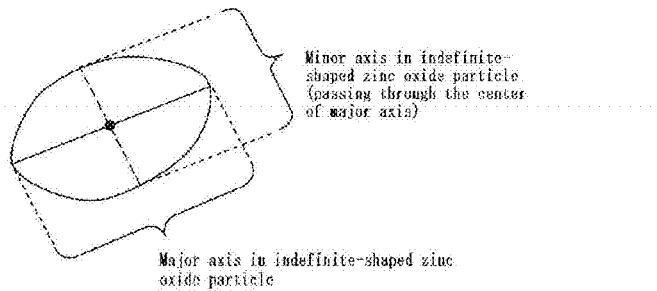

Method for measurement of aspect ratio of zinc oxide particles having an indefinite shape: a major axis and a minor axis passing through the center of the major axis are measured for an indefinite-shaped zinc oxide particle in the TEM photograph, and an aspect ratio is determined according to the formula: aspect ratio = average value of major axis/minor axis for 250 particles.

FIG.21

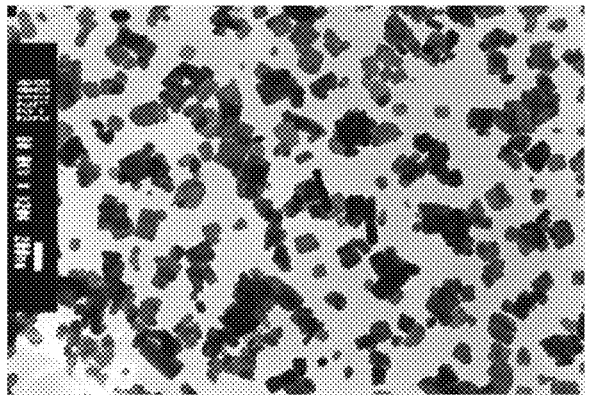

FIG. 22

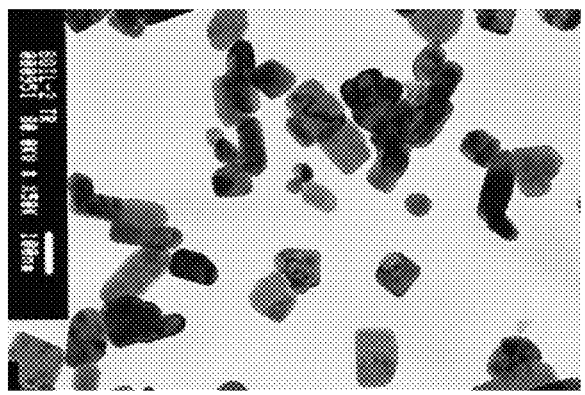

METHOD FOR PRODUCTION OF ZINC OXIDE PARTICLES

CROSS REFERENCE TO RELATED APPLICATIONS

This application is a Continuation-in-Part of Application No. PCT/JP2012/061280, filed on Apr. 26, 2012, which claims priority to Application No. 2011-101021, filed on Apr. 28, 2011; Application No. PCT/JP2012/061281, filed on Apr. 26, 2012, which claims priority to Application No. 2011-101022, filed on Apr. 28, 2011; and Application No. PCT/JP2012/061282, filed on Apr. 26, 2012, which claims priority to Application No. 2011-101023, filed on Apr. 28, 2011; for which priority is claimed. The entire contents of each of these applications is hereby incorporated by reference.

TECHNICAL FIELD

The present invention relates to a method for production of zinc oxide particles.

BACKGROUND OF THE DISCLOSURE

Zinc oxide particles have been known as a sunscreen ultra-violet blocking agent in cosmetic product applications. However, the applications of the zinc oxide fine particles, which have been used conventionally, are limited from various points of view. Therefore, a new production method which is able to control a particle diameter and particle shape for enhancing the homogeneity thereof has been desired. The following described about various conventional zinc oxides and methods for production of the zinc oxide.

The zinc oxide particles in Patent Document 1 are formed by aggregation of zinc oxide fine particles in a hexagonal plate shape, and therefore proper slippage cannot be achieved. Further, since the particle shape is not sufficiently controlled, physical properties tend to vary, so that it is difficult to obtain a cosmetic with stable quality.

Patent Document 2 describes flaky plate-shaped zinc oxide particles, and uses thereof in cosmetics and industrial applications. However, many of the flaky plate-shaped zinc oxide particles described in Patent Document 2 have a large particle diameter, and the particle shape is not controlled to be fine and uniform. In the production method, a basic zinc salt is generated, and therefore a thermal decomposition step such as that of calcinating is required to obtain zinc oxide.

Patent Document 3 describes hexagonal plate-shaped zinc oxide particles. However, the zinc oxide particles in Patent Document 3 significantly vary in particle diameter and shape, and are aggregated, so that problems such as those described above cannot be sufficiently rectified.

Patent Document 4 describes hexagonal prism- and hexagonal barrel-shaped zinc oxide particles which can be used as a cosmetic. However, in the described production method, hexagonal prism-shaped zinc oxide particles having a particle diameter of less than 0.5 μm cannot be obtained.

From such a point of view, zinc oxide particles which have a primary particle diameter of 0.1 μm or more and can exhibit higher transparency and higher ultraviolet blocking performance as compared to conventional zinc oxide particles are desired. However, such zinc oxide particles have not been developed.

Patent Document 5 discloses a production method in which a mixed liquid of a zinc compound, acetic acid and glycol is held at a temperature of 50 to 200° C. for 0.5 to 5 hours to generate zinc oxide fine particles having an average particle diameter of 200 nm or less. However, this production method is a method of obtaining a precipitate by heating a solution in which zinc oxide is fully dissolved, and zinc oxide particles obtained by this method are not preferable because particles having an aspect ratio of less than 2.5 cannot be obtained. Further, the production method is not suitable from an industrial point of view because expensive glycol is used.

In applications of heat releasing materials in electronic/electrical fields, aluminum oxide, aluminum nitride, boron nitride, zinc oxide and the like are often used as a heat releasing filler. It is generally known that two or more kinds of spherical particles having different particle diameters are filled, and a filler is filled in a resin or the like at a high rate for achieving high heat releasing performance. Meanwhile, it is considered to make use of anisotropy of thermal conduction by compounding particles of different shapes, such as plate-shaped particles and needle-shaped particles, for more effectively enhancing heat conductivity. However, the zinc oxide particles in Patent Document 1 are aggregates, and therefore influences of heat resistance between particles in plate-shaped particles are significant, so that anisotropy of thermal conduction specific to plate-shaped particles cannot be exhibited.

Usually, in production of zinc oxide particles, mostly a calcinating step is essential. In calcinating, however, equipment capable of performing a treatment at a high temperature is required, and there is the problem that the particle diameter and the particle shape which have been adjusted/controlled in the stage of a zinc oxide precursor are changed by calcinating, and so on. Therefore, it is very preferable to obtain zinc oxide particles without performing calcinating.

PRIOR TECHNICAL DOCUMENTS

Patent Documents

[Patent Document 1] Japanese Kokai Publication 2007-223874
[Patent Document 2] Japanese Kokai Publication Hei7-187673
[Patent Document 3] Japanese Kokai Publication Hei9-137152
[Patent Document 4] Japanese Kokai Publication 2008-254992
[Patent Document 5] Japanese Kokai Publication 2009-29698

SUMMARY OF INVENTION

Problems to be Solved by the Invention

In view of the situations described above, it is an object of the present invention to provide a new method for production of zinc oxide particles which can control the particle diameter and particle shape of obtained zinc oxide particles by selecting suitable conditions, and can prepare zinc oxide applicable to various applications.

Means for Solving Object

The present invention relates to a method for production of zinc oxide particles, comprising a step of aging a zinc oxide raw material in an aqueous zinc salt solution.

Preferably, a zinc salt concentration in the aqueous zinc salt solution is 0.005 mol/l or more and 4.00 mol/l or less.

Preferably, the zinc oxide raw material has particle diameter of 0.005 μm or more and 0.5 μm or less.

The method for production of zinc oxide particles may comprises a step of surface treating the obtained zinc oxide particles.

Effects of the Invention

The method for production of zinc oxide particles of the present invention can obtain zinc oxide particles having various particle shapes and produce zinc oxide particles having high homogeneity in particle diameter and particle shape. Furthermore, by this production method, zinc oxide particles can be obtained directly without passing through a thermal decomposition step such as that of calcinating.

BRIEF DESCRIPTION OF THE DRAWINGS

FIG. 20 is a schematic view illustrating a method for measurement of an aspect ratio of indefinite-shaped zinc oxide particles obtained in Examples 11 to 13, and in Comparative examples 1 to 7.

FIG. 21 is a transmission electron microscope photograph of zinc oxide particles of the present invention obtained in Example 6.

FIG. 22 is a transmission electron microscope photograph of zinc oxide particles of the present invention obtained in Example 6 which are observed with a higher magnification.

DETAILED DESCRIPTION OF PREFERRED EMBODIMENTS

Figure 1:
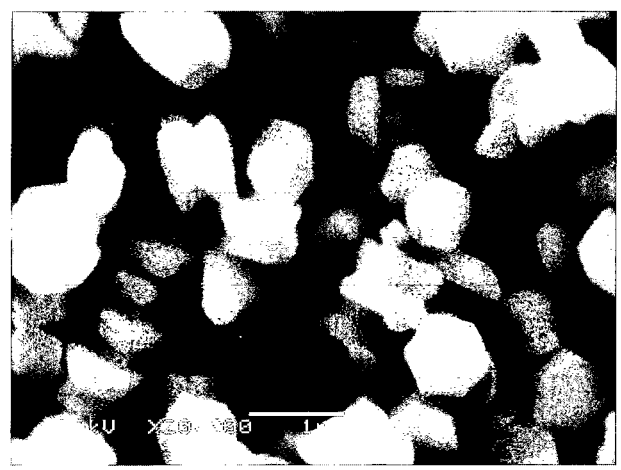
FIG. 1 is a scanning electron microscope photograph of zinc oxide particles of the present invention obtained in Example 1.

The present invention will be described in detail hereinafter.

The present invention relates to a method for production of zinc oxide particles, comprising a step of aging a source of zinc oxide in an aqueous zinc salt solution.

In this production method, unlike a method of performing aging after forming particles by neutralization of a zinc salt compound as described in the cited documents, zinc oxide raw material is added as a seed, and therefore particles are grown as the surface layers thereof are repeatedly dissolved and precipitated while zinc oxide raw material as a seed serves as cores. Thus, the particle diameters of zinc oxide particles obtained after aging using, as a base, zinc oxide raw material as cores are determined, and particle shapes and particle diameters are established in a uniform state, so that the particle size distribution can be further sharpened. Therefore, the above-mentioned production method is preferable in that the particle diameter and the particle size distribution are more precisely controlled. The production method is also preferable in that owing to zinc oxide raw material as a seed, zinc oxide particles having a sharp particle size distribution can be selectively obtained.

By adjusting an aging temperature, an aging time, a zinc salt concentration, a zinc oxide raw material concentration and so on as necessary, the particle diameter and shape, and the like can be adjusted.

In production of zinc oxide particles as described above, zinc oxide raw material is used. The zinc oxide raw material is not particularly limited, but its particle diameter is preferably 0.005 μm or more and 0.5 μm or less. The particle diameter of the zinc oxide raw material corresponds to a diameter of a sphere having the same surface area as a specific surface area determined by a BET method. That is, the particle diameter is a value determined by the following calculation formula from a specific surface area: Sg determined by making a measurement using a fully automatic BET specific surface area measuring device Macsorb (manufactured by Mountech Co., Ltd.), and a true specific gravity of zinc oxide: ρ.

$$\text{particle diameter}(\mu m) = [6/(Sg \times \rho)]$$

(Sg (m$^2$/g): specific surface area, ρ (g/cm$^3$): true specific gravity of particle)

As the true specific gravity of particle: ρ, a value of the true specific gravity of zinc oxide, i.e. 5.6, was used for the above calculation.

Zinc oxide raw material that can be used as a raw material is not particularly limited, and zinc oxide produced by a known method can be used. Examples of those that are commercially available may include FINEX-75, FINEX-50, FINEX-30, Fine zinc oxide, SF-15, and ZINC OXIDE NO. 1 manufactured by Sakai Chemical Industry Co., Ltd.

In the method for production of zinc oxide particles according to the present invention, the zinc oxide raw material described above is aged in an aqueous zinc salt solution. That is, the zinc oxide raw material is dispersed in an aqueous zinc salt solution, and heated in this state to be crystal-grown.

The solvent to be used in the present invention is water. Water is inexpensive and safe in terms of handling, and is therefore most preferable from the viewpoint of production control and costs.

The aqueous zinc salt solution to be used is not particularly limited, and examples thereof may include aqueous solutions of zinc acetate, zinc nitrate, zinc sulfate, zinc chloride and zinc formate. Particularly when an aqueous zinc acetate solution, among the aqueous zinc salt solutions, is used, specific zinc oxide particles of the present invention can be suitably obtained.

These aqueous zinc salt solutions may be those prepared by mixing zinc oxide, an acid and water to acid-hydrolyze zinc oxide. The particle shape and particle size of zinc oxide to be used when the aqueous zinc salt solution is prepared with zinc oxide, an acid and water are not particularly limited, but the Zn purity of zinc oxide is preferably 95% or more for reducing impurities as much as possible. Examples of the acid include acetic acid, nitric acid, sulfuric acid, hydrochloric acid, formic acid, citric acid, oxalic acid, propionic acid, malonic acid, lactic acid, tartaric acid, gluconic acid and succinic acid, and particularly when acetic acid is used, specific zinc oxide particles of the present invention can be suitably obtained. Two of these aqueous zinc salt solutions may be used in combination.

The zinc salt concentration in the aqueous zinc salt solution is preferably 0.005 mol/l or more and 4.00 mol/l or less, and particularly the zinc salt concentration in the aqueous zinc acetate solution is preferably more than 0.05 mol/l and 2.00 mol/l or less.

The zinc salt concentration in the aqueous zinc salt solution is preferably set according to the shape of the desired zinc oxide particles because the zinc salt concentration influences the shape of the zinc oxide particles to be obtained. For example, when the concentration is more than 0.45 mol/l and 4.00 mol/l or less, the zinc oxide particle to be obtained tends to be hexagonal plate-shaped particles. When the concentration is 0.30 mol/l or more and 0.45 mol/l or less, the zinc oxide particles to be obtained tend to be hexagonal prism-shaped particles. When the concentration is less than 0.30 mol/l, the zinc oxide particles to be obtained tend to be zinc oxide ultra fine particles having well-ordered particle diameter and particle shape.

When zinc oxide raw material is added in the aqueous zinc salt solution to form a slurry, the concentration of zinc oxide raw material is preferably 10 to 500 g/l based on the total amount of the slurry.

The method for preparation of a slurry is not particularly limited, and for example, a homogeneous slurry having a zinc oxide raw material concentration of 10 to 500 g/l can be formed by adding the above-described components to water, and dispersing the components at 5 to 30° C. for 10 to 30 minutes.

In the aging described above, components other than zinc oxide raw material, a zinc salt and water may be added in a small amount within the bounds of not impairing the effect of the present invention. For example, a dispersant and the like may be added.

Preferably, aging is performed at 45 to 110° C. The aging time may be 0.5 to 24 hours. The particle diameter can be adjusted by conditions such as an aging temperature, an aging time, a zinc oxide raw material concentration and a zinc salt concentration. Therefore, by adjusting these conditions, the method for production of zinc oxide particles according to the present invention can obtain zinc oxide particles having various shapes and particle diameters, on the other hand, having a high homogeneity in a particle diameter and a particle shape as well as a high purity.

Zinc oxide particles thus obtained may be subjected to post-treatments such as filtration, water washing and drying as necessary.

Zinc oxide particles produced by the above-described method may be classified by sieving as necessary. Examples of methods for classification by sieving may include wet classification and dry classification. Further, a treatment such as wet crushing or dry crushing may be performed.

As described above, the method for production of zinc oxide particles according to the present invention is capable of obtaining zinc oxide particles without performing a calcinating treatment, but zinc oxide particles obtained by the above-described method may be subjected to a calcinating treatment. For calcinating, mention may be made of a known method using an arbitrary device, and treatment conditions and the like are not particularly limited.

The method for production of zinc oxide particles may further comprise a surface treatment step as necessary. The surface treatment is not particularly limited, and examples thereof may include known treatment methods such as inorganic surface treatments to form an inorganic oxide layer such as a silica layer, an alumina layer, a zirconia layer or a titania layer, and various kinds of other surface treatments. Two or more kinds of surface treatments may be sequentially performed.

More specific examples of the surface treatment may include surface treatments with a surface treatment agent selected from an organic silicon compound, an organic aluminum compound, an organic titanium compound, a higher fatty acid, a higher fatty acid ester, a metallic soap, a polyhydric alcohol and an alkanolamine. For the surface treatment agent described above, a treatment amount can be appropriately set according to the particle diameter of the zinc oxide particle.

Examples of the organic silicon compound may include organopolysiloxanes such as methyl hydrogen polysiloxane and dimethyl polysiloxane, and silane coupling agents such as triethoxyvinylsilane and diphenyldimethoxysilane.

Examples of the higher fatty acid may include higher fatty acids having 10 to 30 carbon atoms, such as lauric acid, stearic acid and palmitic acid.

Examples of the higher fatty acid ester may include alkyl esters of the above-described higher fatty acids, such as octyl palmitate.

Examples of the metallic soap may include metal salts of the above-described higher fatty acids, such as aluminum stearate and aluminum laurate. The metal species that forms the metallic soap is not particularly limited, and examples thereof may include aluminum, lithium, magnesium, calcium, strontium, barium, zinc and tin.

Examples of the polyhydric alcohol may include trimethylolethane, trimethylolpropane and pentaerythritol.

Examples of the alkanolamine may include diethanolamine, dipropanolamine, triethanolamine and tripropanolamine.

The treatment with the surface treatment agent can be achieved by mixing a predetermined amount of the surface treatment agent with the zinc oxide particles. Further, the treatment can be achieved by adding the zinc oxide particles to an appropriate medium, for example, water, an alcohol, an ether or the like to be suspended, adding a surface treatment agent to the suspension, followed by stirring, separating, drying and crushing the suspension, or solidifying by evaporation and crushing the suspension.

Since zinc oxide particles subjected to the surface treatment described above have various kinds of coating layers such as those of zinc silicate on the surfaces thereof, the physiological activity and chemical activity thereof are suppressed when the zinc oxide particles are compounded in a cosmetic, and therefore a particularly excellent cosmetic product can be provided.

The zinc oxide particles obtained by the method for production of zinc oxide particles of the present invention are not particularly limited for applications thereof, and can be suitably used in, for example, applications of raw materials of cosmetics and heat releasing fillers.

Further, the zinc oxide particles of the present invention can be used in the fields of vulcanization accelerators for rubber, pigments for coatings/inks, electronic components such as ferrites and varistors, pharmaceuticals and so on in addition to the cosmetics and heat releasing fillers described above.

EXAMPLES

Hereinafter, the present invention will be explained with reference to examples. However, the present invention is not limited to these examples.

The measurement methods for each evaluation item in the examples are described in detail, prior to examples.

(Composition of Obtained Particles)

The X-ray diffraction spectra shown in Figs and the compositions of the obtained particles in Table show results of performing analysis using an X-ray diffractometer UltimaIII (manufactured by Rigaku Corporation) having an X-ray tube with copper. From these results, it is evident that zinc oxide was obtained in the examples.

(Primary Particle Diameter)

Figure 17:
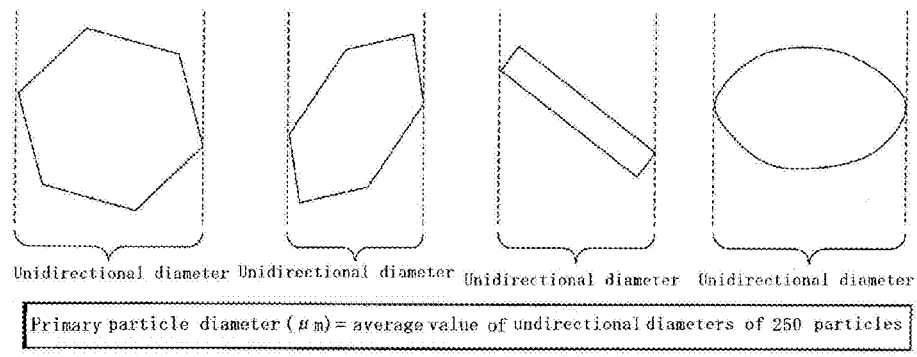
FIG. 17 is a schematic view illustrating a method for measurement of a primary particle diameter of zinc oxide particles obtained in Examples 1 to 5, and in Comparative examples 1 to 5.

The primary particle diameter, in Table 1 of this specification, is a particle diameter ($\mu$m) defined by a unidirectional particle diameter in a visual field of 2000 to 50000 magnification in a transmission electron microscope (TEM, JEM-1200EX II, manufactured by JEOL Ltd.) photograph (distance between two parallel lines in a fixed direction with a particle held therebetween; measurements are made in a fixed direction regardless of shapes of particles on the image), and is a geometric particle diameter obtained by measuring the unidirectional diameters of 250 primary particles in the TEM photograph and determining an average value of a cumulative distribution thereof. For the method for measurement of a primary particle diameter, FIG. 17 is attached.

(Aspect Ratio)

Figure 18:
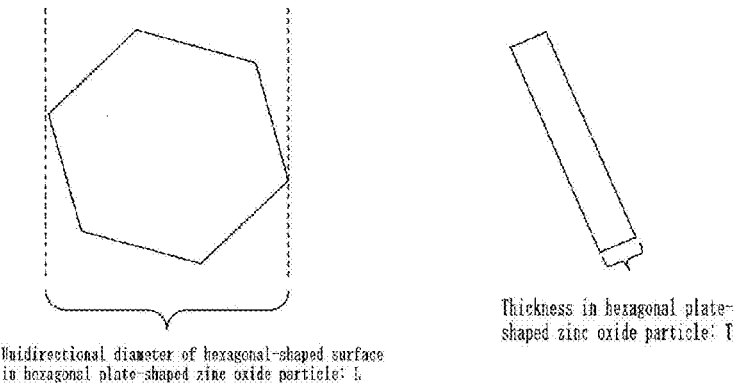
FIG. 18 is a schematic view illustrating a method for measurement of an aspect ratio of hexagonal plate-shaped zinc oxide particles obtained by the method for production of the present invention.

The aspect ratio of the hexagonal plate-shaped zinc oxide particles is a value determined as a ratio of L/T where L is an average value of measured particle diameters ($\mu$m) of 250 particles, the particle diameter defined by a unidirectional diameter for particles in which the hexagonal-shaped surface of the hexagonal plate-shaped zinc oxide particle faces frontward (distance between two parallel lines in a fixed direction with a particle held therebetween; measurements are made in a fixed direction for particles in which the hexagonal-shaped surface on the image faces frontward), and T is an average value of measured thicknesses ($\mu$m) (length of the shorter side of rectangle) of 250 particles for particles in which the side surface of the hexagonal plate-shaped zinc oxide particle faces frontward (particles that appear rectangular), in a visual field of 2000 to 50000 magnification in a transmission electron microscope (TEM, JEM-1200EX II, manufactured by JEOL Ltd.) photograph or a scanning electron microscope (SEM, JSM-5600, manufactured by JEOL Ltd.) photograph. For the method for measurement of an aspect ratio, FIG. 18 is attached.

For the aspect ratio of the zinc oxide particles having an indefinite particle shape, a major axis of the indefinite-shaped zinc oxide particle and a minor axis passing through the center of the major axis are measured in a visual field of 2000 to 50000 magnification in a transmission electron microscope (TEM, JEM-1200EX II, manufactured by JEOL Ltd.) photograph, and a ratio between the lengths of the major axis and the minor axis: major axis/minor axis is determined. The ratio of major axis/minor axis is measured in the manner described above for 250 indefinite-shaped zinc oxide particles in the TEM photograph, and an average value of a cumulative distribution thereof is determined as an aspect ratio. The method for measurement of an aspect ratio of indefinite-shaped zinc oxide particles is shown in FIG. 20.

Figure 19:
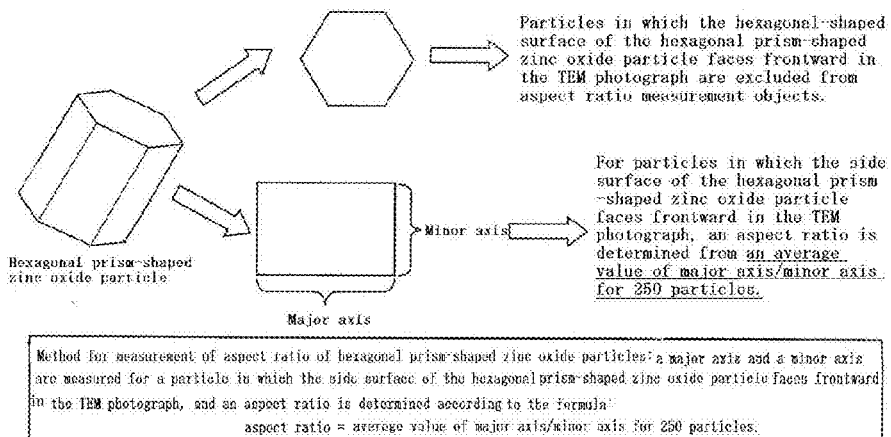
FIG. 19 is a schematic view illustrating a method for measurement of an aspect ratio of hexagonal prism-shaped zinc oxide particles obtained by the method for production of the present invention.

The aspect ratio of the zinc oxide particles having a hexagonal prism particle shape in the comparative example is determined in the following manner. For the aspect ratio of the hexagonal prism-shaped zinc oxide particles, a major axis and a minor axis are measured for particles in which the side surface of the hexagonal prism-shaped zinc oxide particle faces frontward (particles observed as a rectangular or square shape) in a visual field of 2000 to 50000 magnification in a transmission electron microscope (TEM, JEM-1200EX II, manufactured by JEOL Ltd.) photograph, and a ratio between the lengths of the major axis and the minor axis: major axis/minor axis is determined. The ratio of major axis/minor axis is measured in the manner described above for 250 hexagonal prism-shaped zinc oxide particles in the TEM photograph, and an average value of a cumulative distribution thereof is determined as an aspect ratio. Hexagonal prism-shaped zinc oxide particles in which the hexagonal-shaped surface faces frontward were excluded from measurement objects because it was difficult to determine the thickness. The method for measurement of an aspect ratio of hexagonal prism-shaped zinc oxide particles is shown in FIG. 19.

(Crystallite Diameter)

For the crystallite diameter (μm) in Table 1 of this specification, results of performing analysis using an X-ray diffractometer UltimaIII (manufactured by Rigaku Corporation) having an X-ray tube with copper are shown. The crystallite usually means a small single crystal in a microscopic level, which forms a crystalline substance. In Table 1 of this specification, the crystallite diameter (μm) is a value determined from a half width of a diffraction peak of the plate-shaped surface: (002) plane of zinc oxide in the X-ray diffraction pattern of a hexagonal wurtzite-type zinc oxide particle.

(Crystallite Diameter/Primary Particle Diameter)

A value shown as crystallite diameter/primary particle diameter in Table 1 of this specification is a value as an indicator of a level of independency of primary particles that form a powder. As described previously, the primary particle diameter is a particle diameter (μm) defined by a unidirectional particle diameter in a visual field of 2000 to 50000 magnification in a transmission electron microscope (TEM, JEM-1200EX II, manufactured by JEOL Ltd.) photograph (distance between two parallel lines in a fixed direction with a particle held therebetween; measurements are made in a fixed direction regardless of shapes of particles on the image), and is a geometric particle diameter obtained by measuring the unidirectional diameters of 250 primary particles in the TEM photograph and determining an average value of a cumulative distribution thereof. On the other hand, the crystallite diameter is a value determined from a half width of a diffraction peak of the plate-shaped surface: (002) plane of zinc oxide in the X-ray diffraction pattern as described previously. Therefore, as the value of crystallite diameter/primary particle diameter becomes closer to 1, a difference between the geometric particle diameter and the single crystal size decreases, which means that primary particles are not aggregated particles, but exist independently as single crystal particles. The values of crystallite diameter/primary particle diameter of the hexagonal plate-shaped zinc oxide particles obtained in Examples 4 and 5 are both 0.64, and therefore primary particles are not aggregated particles but rather single crystals.

(Powder Touch)

The powder touch herein is an indicator showing slippage and roughness in a touch felt when a small amount of a powder is placed on the skin and the powder is drawn by a finger. Herein, score evaluations are performed in five grades with score 5 given when slippage is very good and no roughness is felt, score 4 given when slippage is good and almost no roughness is felt, score 3 given when both slippage and roughness are moderate, score 2 given when slippage is poor and roughness is felt, and score 1 given when slippage is very poor and roughness is felt. The results are shown in Table 1. A higher score means a better powder touch, and particles having a better powder touch can be more suitably used in applications of foundations and other makeup cosmetics.

(Preparation of Coating Film)

In a mayonnaise bottle having a volume of 75 ml, 2 g of zinc oxide particles obtained in each of examples and comparative examples, 10 g of varnish (ACRYDIC A-801-P manufactured by DIC Corporation), 5 g of butyl acetate (special grade reagent, manufactured by Wako Pure Chemical Industries, Ltd.), 5 g of xylene (genuine special grade, manufactured by JUNSEI CHEMICAL CO., LTD.) and 38 g of glass beads (1.5 mm, manufactured by Potters-Ballotini Co., Ltd.) were put and sufficiently mixed, then fixed in a paint conditioner Model 5410 (manufactured by RED DEVIL, Inc.), and subjected to a dispersion treatment by giving vibrations for 90 minutes, thereby preparing a coating. Next, a small amount of the prepared coating was added dropwise onto a slide glass (length/width/thickness=76 mm/26 mm/0.8 to 1.0 mm, manufactured by Matsunami Glass Ind., Ltd.), and a coating film was prepared using a bar coater (No. 579 ROD No. 6, manufactured by YASUDA SEIKI SEISAKUSHO, LTD.). The prepared coating film was dried at 20° C. for 12 hours, and then used for measurement of total light transmittance 1, total light transmittance 2, total light transmittance 3, total light transmittance 4(%), parallel light transmittance 1, parallel light transmittance 2, haze, and sharpened gloss (20° gloss).

(Total Light Transmittance 1, Total Light Transmittance 2, Total Light Transmittance 3, Parallel Light Transmittance 1 and Parallel Light Transmittance 2)

Herein, total light transmittance 1(%), total light transmittance 2(%), total light transmittance 3(%), parallel light transmittance 1(%) and parallel light transmittance 2(%) are values obtained by measuring the prepared coating film using a spectrophotometer V-570 (manufactured by JASCO Corporation). The value of total light transmittance 1(%) is a value of total light transmittance at a wavelength of 310 nm, the value of total light transmittance 2(%) is a value of total light transmittance at a wavelength of 350 nm, the value of total light transmittance 3(%) is a value of total light transmittance at a wavelength of 375 nm, the value of parallel light transmittance 1(%) is a value of parallel light transmittance at a wavelength of 500 nm, and the value of parallel light transmittance 2(%) is a value of parallel light transmittance at a wavelength of 700 nm. An ultraviolet blocking effect to ultraviolet rays having a wavelength of UVB is enhanced as the value of total light transmittance 1(%) becomes smaller, and an ultraviolet blocking effect to ultraviolet rays having a wavelength of UVA is enhanced as the values of total light transmittance 2(%) and total light transmittance 3(%) become smaller. Particularly, when the value of total light transmittance 3(%) is small, a blocking region to ultraviolet rays having a wavelength of UVA extends over a wider range. Visible light transparency is enhanced as the values of parallel light transmittance 1(%) and parallel light transmittance 2(%) become larger.

(Total Light Transmittance 4 and Haze)

The total light transmittance 4(%) and haze (%) in Table 1 are values obtained by measuring the prepared coating film using a haze meter HM-150 (manufactured by MURAKAMI COLOR RESEARCH LABORATORY CO., Ltd.). When coating films having comparable values of total light transmittance 4(%) are compared, those having a higher haze (%) have a higher effect of blurring a base (a so called soft focus effect).

(D50, D90, D10, D90/D10)

Herein, D50 (μm), D90 (μm) and D10 (μm) are values measured by a dynamic light scattering particle diameter distribution measuring device Nanotrack UPA-UT (manufactured by Nikkiso Co., Ltd.). The zinc oxide particles of each of examples and comparative examples were dispersed in water, and the dispersion was measured with the refractive index of zinc oxide set at 1.95 and the refractive index of water set at 1.309. D50 (μm) denotes a 50% cumulative particle diameter on the volume basis, D90 (μm) denotes a 90% cumulative particle diameter on the volume basis, and D10 (μm) denotes a 10% cumulative particle diameter on the volume basis. A ratio of D90/D10 is calculated as an indicator of sharpness of the particle size distribution. The particle size distribution broadens as the value becomes larger, while the particle size distribution sharpens as the value becomes smaller.

(Primary Particle Diameter)

The primary particle diameter in Tables 2 and 3 corresponds to a diameter of a sphere having the same surface area as a specific surface area determined by a BET method. That is, the primary particle diameter is a value determined according to the relational expression:

primary particle diameter(μm)=[6/(Sg×ρ)]

(Sg (m$^2$/g): specific surface area, ρ (g/cm$^3$): true specific gravity of particle.

The specific surface area: Sg by the BET method was measured using a fully automatic BET specific surface area measuring device Macsorb (manufactured by Mountech Co., Ltd.), and the measurement value was used for the calculation described above. As the true specific gravity of particle: p, a value of the true specific gravity of zinc oxide, i.e. 5.6, was used for the above calculation.

(Crystallite Diameter)

For the crystallite diameter (μm) in Tables 3, results of performing analysis using an X-ray diffractometer UltimaIII (manufactured by Rigaku Corporation) having an X-ray tube with copper are shown. The crystallite usually means a small single crystal in a microscopic level, which forms a crystalline substance. Herein, the crystallite diameter (m) is a value determined from a half width of a diffraction peak of the (101) plane of zinc oxide in the X-ray diffraction pattern of a hexagonal wurtzite-type zinc oxide particle.

(Crystallite Diameter/Primary Particle Diameter)

A value shown as crystallite diameter/primary particle diameter in Tables 3 is a value as an indicator of a level of independency of primary particles that form a powder. The primary particle diameter is a geometric particle diameter corresponding to a diameter of a sphere having the same surface area as a specific surface area determined by a BET method as described previously. On the other hand, the crystallite diameter is a value determined from a half width of a diffraction peak of the (101) plane of zinc oxide in the X-ray diffraction pattern as described previously. Therefore, as the value of crystallite diameter/primary particle diameter becomes closer to 1, a difference between the geometric particle diameter and the single crystal size decreases, which means that primary particles are not aggregated particles, but exist independently as single crystal particles.

(Oil Absorption)

The oil absorption was measured by the method described in Pigment Test Method-Oil Absorption in JIS K 5101-13-2. As an oil, isopropyl myristate (EXCEPARL IPM manufactured by Kao Corporation) was used in place of boiled linseed oil.

(BET Specific Surface Area)

The BET specific surface area (m$^2$/g) is a value measured using a fully automatic BET specific area measuring device Macsorb (manufactured by Mountech Co., Ltd.), and corresponds to a specific surface area: Sg used for calculation of the primary particle diameter.

(Oil Absorption/BET Specific Surface Area)

The oil absorption/BET specific surface area (ml/100 m$^2$) is a value obtained by dividing the value of the oil absorption (ml/100 g) by the value of the BET specific surface area (m$^2$/g), and as this value becomes smaller, the oil absorption per unit area of the particle surface is low, leading to reduced aggregation of particles and enhanced dispersibility of particles.

(Apparent Density)

The apparent density is a value measured by the method described in Pigment Test Method-Apparent Density or Apparent Specific Volume (Standing Method) in JIS K 5101-12-1. The volume of the powder decreases as the apparent density increases.

(Sharpened gloss (20° Gloss))

Herein, the sharpened gloss (20° gloss) of the coating film is a value obtained by measuring the coating film using GLOSS METER GM-26D (manufactured by MURAKAMI COLOR RESEARCH LABORATORY CO., Ltd.), and is a value of glossiness at an incidence angle of 20°. A larger value of sharpened gloss (20° gloss) corresponds to reduced aggregation and enhanced dispersibility of zinc oxide particles in the prepared coating film.

Example 1

Figure 2:
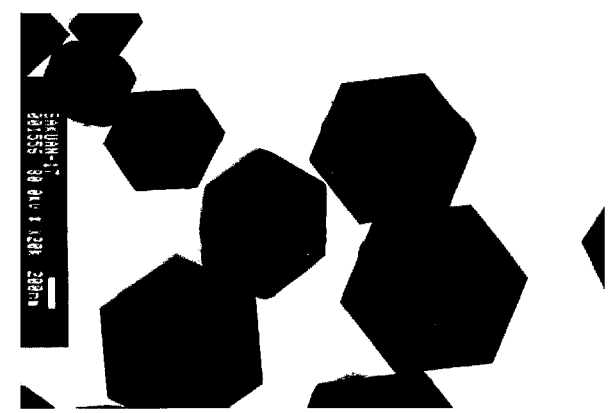
FIG. 2 is a transmission electron microscope photograph of zinc oxide particles of the present invention obtained in Example 1.

In 1200 ml of an aqueous zinc acetate solution prepared by dissolving 266.07 g of zinc acetate dihydrate (zinc acetate manufactured by Hosoi Chemical Industry Co., Ltd.) in water so as to have a concentration of 1 mol/l in terms of zinc acetate dihydrate, 80 g of FINEX-50 (manufactured by Sakai Chemical Industry Co., Ltd., particle diameter: 0.02 μm) was repulped, thereby forming a slurry. Subsequently, the slurry was heated to 100° C. over 60 minutes with stirring, and aged at 100° C. for 7 hours with stirring. After aging, the slurry was quenched immediately, then filtered and washed with water. Subsequently, the obtained solid was repulped in 3 liters of water to forma slurry, and the slurry was heated to 100° C. over 60 minutes with stirring, and heated and washed at 100° C. for 30 minutes with stirring. After heating and washing, the slurry was filtered, washed with water, and dried at 110° C. for 12 hours to obtain hexagonal plate-shaped zinc oxide particles having a primary particle diameter of 1.12 μm. The size and form of the obtained particles were observed with a scanning electron microscope (SEM, JSM-5600, manufactured by JEOL Ltd.). The obtained electron microscope photograph is shown in FIG. 1. Further, an observation was made with a transmission electron microscope (TEM, JEM-1200EX II, manufactured by JEOL Ltd.). The obtained electron microscope photograph is shown in FIG. 2. The results of evaluating the physical properties of the obtained particles and the physical properties of the coating film are shown in Table 1.

Example 2

Figure 3:
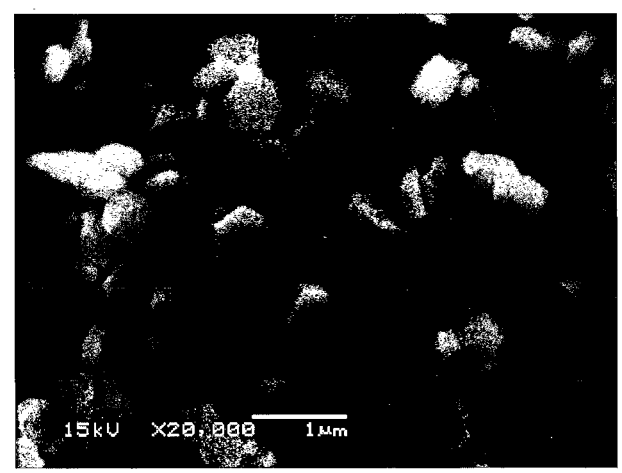
FIG. 3 is a scanning electron microscope photograph of zinc oxide particles of the present invention obtained in Example 2.
Figure 4:
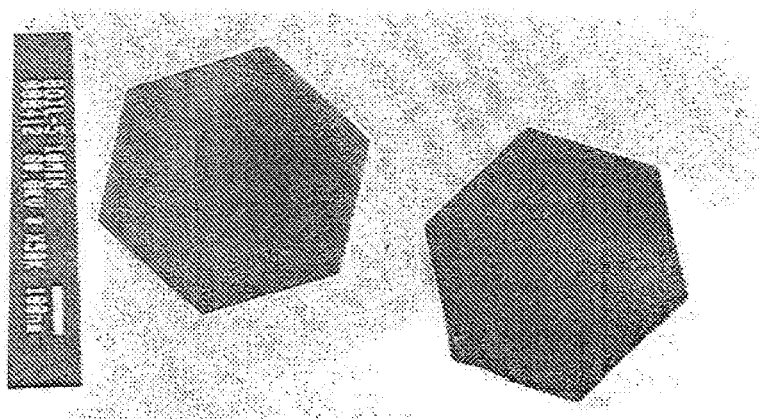
FIG. 4 is a transmission electron microscope photograph of zinc oxide particles of the present invention obtained in Example 2.
Figure 5:
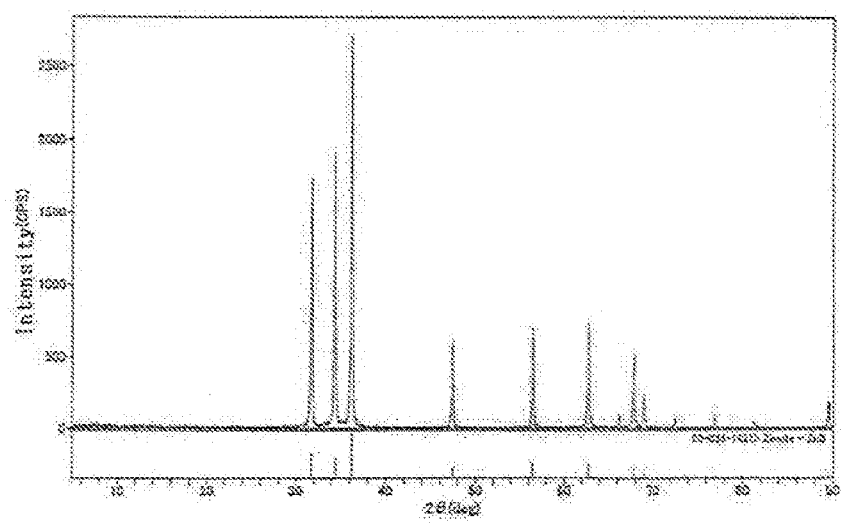
FIG. 5 is an X-ray diffraction spectrum of zinc oxide particles of the present invention obtained in Example 2.

In 1200 ml of an aqueous zinc acetate solution prepared by dissolving 266.07 g of zinc acetate dihydrate (zinc acetate manufactured by Hosoi Chemical Industry Co., Ltd.) in water so as to have a concentration of 1 mol/l in terms of zinc acetate dihydrate, 80 g of FINEX-50 (manufactured by Sakai Chemical Industry Co., Ltd., particle diameter: 0.02 μm) was repulped, thereby forming a slurry. Subsequently, the slurry was heated to 100° C. over 60 minutes with stirring, and aged at 100° C. for 3 hours with stirring. After aging, the slurry was quenched immediately, then filtered and washed with water. Subsequently, the obtained solid was repulped in 3 liters of water to form a slurry, and the slurry was heated to 100° C. over 60 minutes with stirring, and heated and washed at 100° C. for 30 minutes with stirring. After heating and washing, the slurry was filtered, washed with water, and dried at 110° C. for 12 hours to obtain hexagonal plate-shaped zinc oxide particles having a primary particle diameter of 0.53 μm. The size and form of the obtained particles were observed with a scanning electron microscope (SEM, JSM-5600, manufactured by JEOL Ltd.). The obtained electron microscope photograph is shown in FIG. 3. Further, an observation was made with a transmission electron microscope (TEM, JEM-1200EX II, manufactured by JEOL Ltd.). The obtained electron microscope photograph is shown in FIG. 4. Further, the X-ray diffraction spectrum of the obtained particles is shown in FIG. 5. The results of evaluating the physical properties of the obtained particles and the physical properties of the coating film are shown in Table 1.

Example 3

Figure 6:
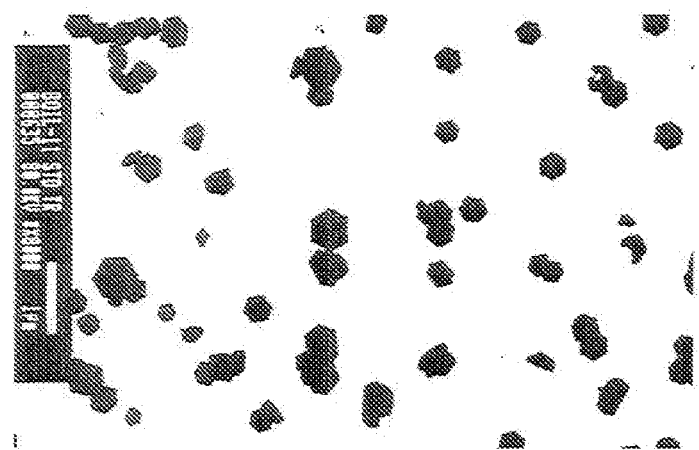
FIG. 6 is a transmission electron microscope photograph of zinc oxide particles of the present invention obtained in Example 3.
Figure 7:
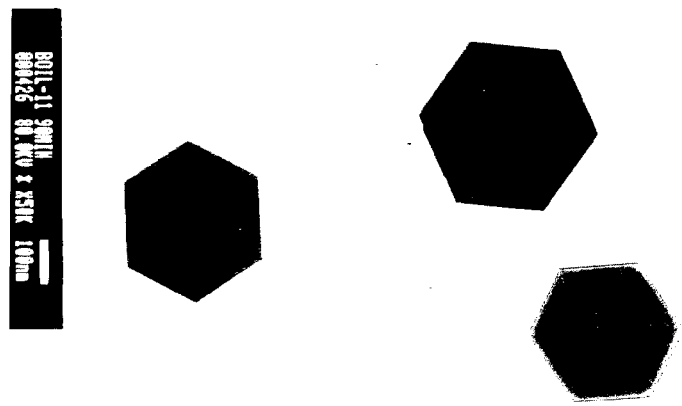
FIG. 7 is a transmission electron microscope photograph of zinc oxide particles of the present invention obtained in Example 3 which are observed with a higher magnification.

In 1200 ml of an aqueous zinc acetate solution prepared by dissolving 266.07 g of zinc acetate dihydrate (zinc acetate manufactured by Hosoi Chemical Industry Co., Ltd.) in water so as to have a concentration of 1 mol/l in terms of zinc acetate dihydrate, 80 g of FINEX-50 (manufactured by Sakai Chemical Industry Co., Ltd., particle diameter: 0.02 μm) was repulped, thereby forming a slurry. Subsequently, the slurry was heated to 100° C. over 60 minutes with stirring, and aged at 100° C. for 1 hour with stirring. After aging, the slurry was quenched immediately, then filtered and washed with water. Subsequently, the obtained solid was repulped in 3 liters of water to form a slurry, and the slurry was heated to 100° C. over 60 minutes with stirring, and heated and washed at 100° C. for 30 minutes with stirring. After heating and washing, the slurry was filtered, washed with water, and dried at 110° C. for 12 hours to obtain hexagonal plate-shaped zinc oxide particles having a primary particle diameter of 0.30 μm. The size and form of the obtained particles were observed with a transmission electron microscope (TEM, JEM-1200EX II, manufactured by JEOL Ltd.). The obtained electron microscope photograph is shown in FIG. 6. Further, an electron microscope photograph with a higher magnification is shown in FIG. 7. The results of evaluating the physical properties of the obtained particles and the physical properties of the coating film are shown in Table 1.

Example 4

Figure 8:
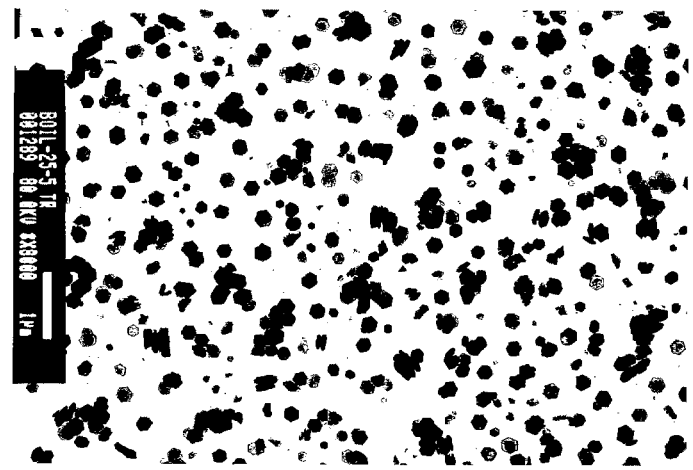
FIG. 8 is a transmission electron microscope photograph of zinc oxide particles of the present invention obtained in Example 4.
Figure 9:
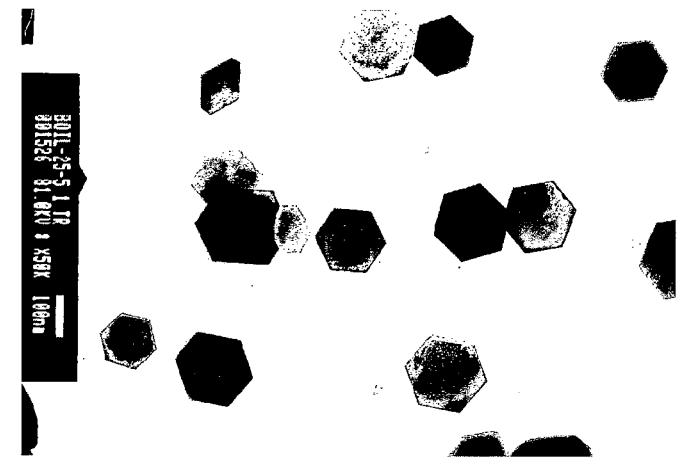
FIG. 9 is a transmission electron microscope photograph of zinc oxide particles of the present invention obtained in Example 4 which are observed with a higher magnification.

In 1200 ml of an aqueous zinc acetate solution prepared by dissolving 133.02 g of zinc acetate dihydrate (zinc acetate manufactured by Hosoi Chemical Industry Co., Ltd.) in water so as to have a concentration of 0.5 mol/l in terms of zinc acetate dihydrate, 80 g of FINEX-50 (manufactured by Sakai Chemical Industry Co., Ltd., particle diameter: 0.02 μm) was repulped, thereby forming a slurry. Subsequently, the slurry was heated to 100° C. over 60 minutes with stirring, and aged at 100° C. for 3 hours with stirring. After aging, the slurry was quenched immediately, then filtered and washed with water. Subsequently, the obtained solid was repulped in 3 liters of water to form a slurry, and the slurry was heated to 100° C. over 60 minutes with stirring, and heated and washed at 100° C. for 30 minutes with stirring. After heating and washing, the slurry was filtered, washed with water, and dried at 110° C. for 12 hours to obtain hexagonal plate-shaped zinc oxide particles having a primary particle diameter of 0.11 μm. The size and form of the obtained particles were observed with a transmission electron microscope (TEM, JEM-1200EX II, manufactured by JEOL Ltd.). The obtained electron microscope photograph is shown in FIG. 8. Further, an electron microscope photograph with a higher magnification is shown in FIG. 9. The results of evaluating the physical properties of the obtained particles and the physical properties of the coating film are shown in Table 1. The crystallite diameter of the plate-shaped surface; (002) plane is 0.07 μm.

Example 5

Figure 10:
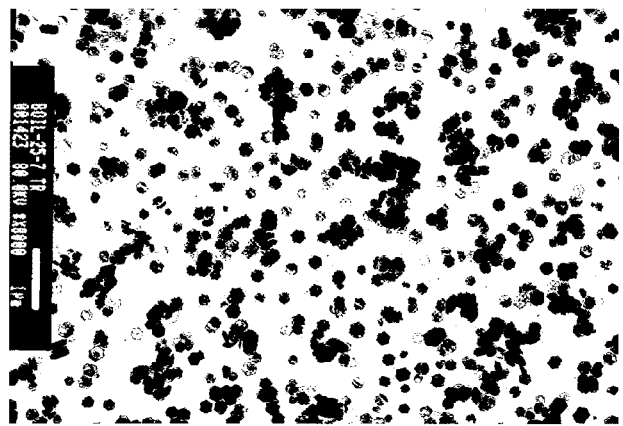
FIG. 10 is a transmission electron microscope photograph of zinc oxide particles of the present invention obtained in Example 5.
Figure 11:
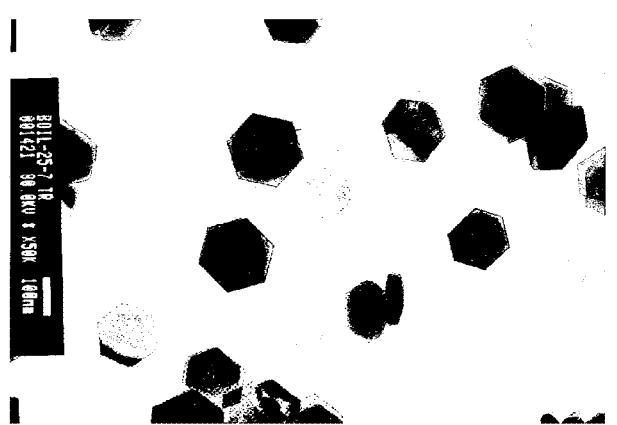
FIG. 11 is a transmission electron microscope photograph of zinc oxide particles of the present invention obtained in Example 5 which are observed with a higher magnification.
Figure 12:
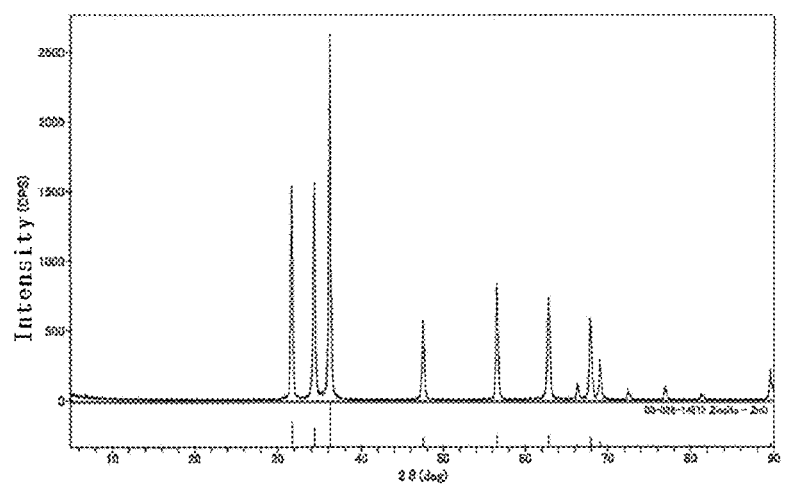
FIG. 12 is an X-ray diffraction spectrum of zinc oxide particles of the present invention obtained in Example 5.

In 1200 ml of an aqueous zinc acetate solution prepared by dissolving 133.02 g of zinc acetate dihydrate (zinc acetate manufactured by Hosoi Chemical Industry Co., Ltd.) in water so as to have a concentration of 0.5 mol/l in terms of zinc acetate dihydrate, 80 g of FINEX-50 (manufactured by Sakai Chemical Industry Co., Ltd., particle diameter: 0.02 μm) was repulped, thereby forming a slurry. Subsequently, the slurry was heated to 70° C. over 42 minutes with stirring, and aged at 70° C. for 3 hours with stirring. After aging, the slurry was quenched immediately, then filtered and washed with water. Subsequently, the obtained solid was repulped in 3 liters of water to form a slurry, and the slurry was heated to 70° C. over 42 minutes with stirring, and heated and washed at 70° C. for 30 minutes with stirring. After heating and washing, the slurry was filtered, washed with water, and dried at 110° C. for 12 hours to obtain hexagonal plate-shaped zinc oxide particles having a primary particle diameter of 0.11 μm. The size and form of the obtained particles were observed with a transmission electron microscope (TEM, JEM-1200EX II, manufactured by JEOL Ltd.). The obtained electron microscope photograph is shown in FIG. 10. Further, an electron microscope photograph with a higher magnification is shown in FIG. 11. Further, the X-ray diffraction spectrum of the obtained particles is shown in FIG. 12. The results of evaluating the physical properties of the obtained particles and the physical properties of the coating film are shown in Table 1. The crystallite diameter of the plate-shaped surface; (002) plane is 0.07 μm.

Comparative Example 1

Figure 13:
FIG. 13 is a transmission electron microscope photograph of zinc oxide particles (Fine zinc oxide manufactured by Sakai Chemical Industry Co., Ltd.) used in Comparative Example 1.

Fine zinc oxide (manufactured by Sakai Chemical Industry Co., Ltd., particle diameter: 0.11 μm) was evaluated in the same manner as in the examples. The electron microscope photograph is shown in FIG. 13. The results of evaluating the physical properties of the obtained particles and the physical properties of the coating film are shown in Table 1.

Comparative Example 2

In 1200 ml of water, 80 g of FINEX-50 (manufactured by Sakai Chemical Industry Co., Ltd., particle diameter: 0.02 μm) was repulped to form a slurry. Subsequently, the slurry was heated to 100° C. over 60 minutes with stirring, and aged at 100° C. for 3 hours with stirring. After aging, the slurry was quenched immediately, then filtered, washed with water, and dried at 110° C. for 12 hours to obtain indefinite-shaped zinc oxide particles having a primary particle diameter of 0.02 μm.

Figure 14:
FIG. 14 is a transmission electron microscope photograph of zinc oxide particles obtained in Comparative Example 2.

The size and form of the obtained particles were observed with a transmission electron microscope (TEM, JEM-1200EX II, manufactured by JEOL Ltd.). The obtained electron microscope photograph is shown in FIG. 14. The results of evaluating the physical properties of the obtained particles and the physical properties of the coating film are shown in Table 1.

Comparative Example 3

In an alumina crucible (length/width/height=100 mm/100 mm/35 mm) was put 10 g of FINEX-50 (manufactured by Sakai Chemical Industry Co., Ltd., particle diameter: 0.02 μm), and left standing and calcinated at 675° C. for 2 hours in an electric muffle furnace (manufactured by TOYO ENGINEERING WORKS, LTD.) to obtain indefinite-shaped zinc oxide particles having a primary particle diameter of 0.30 μm. The results of evaluating the physical properties of the obtained particles and the physical properties of the coating film are shown in Table 1.

Comparative Example 4

Figure 15:
FIG. 15 is a transmission electron microscope photograph of zinc oxide particles (FINEX-50 manufactured by Sakai Chemical Industry Co., Ltd.) used in Comparative Example 4.

FINEX-50 (manufactured by Sakai Chemical Industry Co., Ltd., particle diameter: 0.02 μm) was evaluated in the same manner as in the examples. The electron microscope photograph is shown in FIG. 15. The results of evaluating the physical properties of the obtained particles and the physical properties of the coating film are shown in Table 1.

Comparative Example 5

Figure 16:
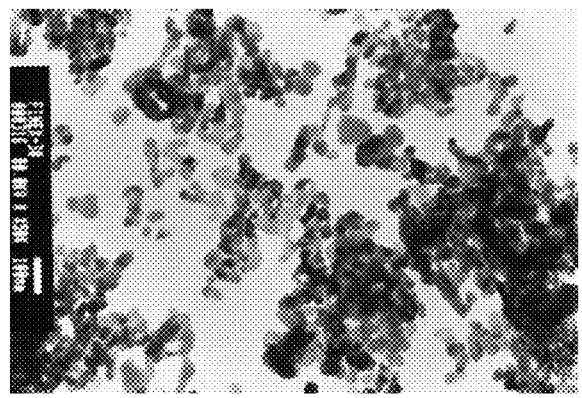
FIG. 16 is a transmission electron microscope photograph of zinc oxide particles (FINEX-30 manufactured by Sakai Chemical Industry Co., Ltd.) used in Comparative Example 5.

FINEX-30 (manufactured by Sakai Chemical Industry Co., Ltd., particle diameter: 0.04 μm) was evaluated in the same manner as in the examples. The electron microscope photograph is shown in FIG. 16. The results of evaluating the physical properties of the obtained particles and the physical properties of the coating film are shown in Table 1.

TABLE 1

| | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Preparation conditions | Zinc oxide fine particles as raw material | FINEX-50 | FINEX-50 | FINEX-50 | FINEX-50 | FINEX-50 | Fine zinc oxide | FINEX-50 | FINEX-50 | FINEX-50 | FINEX-30 |
| | Particle diameter of raw material (μm) | 0.02 | 0.02 | 0.02 | 0.02 | 0.02 | 0.11 | 0.02 | 0.02 | 0.02 | 0.04 |
| | Amount of raw material used in preparation (g) | 80 | 80 | 80 | 80 | 80 | | 80 | 10 | | |
| | Zinc salt used in preparation | Zinc acetate dihydrate | Zinc acetate dihydrate | Zinc acetate dihydrate | Zinc acetate dihydrate | Zinc acetate dihydrate | | | | | |
| | Amount of zinc salt (g) | 266.07 | 266.07 | 266.07 | 133.02 | 133.02 | | | | | |
| | Solvent used in preparation | Water | Water | Water | Water | Water | | Water | | | |
| | Amount of aqueous zinc salt solution (ml) | 1200 | 1200 | 1200 | 1200 | 1200 | | 1200 | | | |
| | Concentration of aqueous zinc salt solution (mol/l) | 1 | 1 | 1 | 0.5 | 0.5 | | | | | |
| | Aging temperature (° C.) | 100 | 100 | 100 | 100 | 70 | | 100 | | | |
| | Aging time (Hr) | 7 | 3 | 1 | 3 | 3 | | 3 | | | |
| | Calcinating temperature/calcinating time | | | | | | | | 675° C./2 Hr | | |
| Physical properties of particles | Composition of obtained particles | Zinc oxide | Zinc oxide | Zinc oxide | Zinc oxide | Zinc oxide | Zinc oxide | Zinc oxide | Zinc oxide | Zinc oxide | Zinc oxide |
| | Particle shape | Hexagonal plate shape | Hexagonal plate shape | Hexagonal plate shape | Hexagonal plate shape | Hexagonal plate shape | Indefinite shape | Indefinite shape | Indefinite shape | Indefinite shape | Indefinite shape |
| | Primary particle diameter (μm) | 1.12 | 0.53 | 0.30 | 0.11 | 0.11 | 0.11 | 0.02 | 0.30 | 0.02 | 0.04 |
| | Crystallite diameter (μm) | | | | 0.07 | 0.07 | | | | | |
| | Crystallite diameter/primary particle diameter | | | | 0.64 | 0.64 | | | | | |
| | Aspect ratio | 3.4 | 3.6 | 3.7 | 3.4 | 3.5 | | | | 1.8 | 2.0 |
| | Powder touch | 5 | 4 | 3 | 3 | 3 | 2 | | 2 | 1 | 1 |
| Physical properties of coating film | Total light transmittance 1 (%) | | 43 | 19 | 12 | 13 | 20 | | 41 | 15 | 13 |
| | Total light transmittance 2 (%) | | 41 | 16 | 9 | 10 | 17 | | 37 | 16 | 13 |
| | Total light transmittance 3 (%) | | 43 | 18 | 10 | 11 | 15 | | 32 | 54 | 24 |
| | Parallel light transmittance 1 (%) | | 20 | 17 | 54 | 55 | 53 | | 37 | 85 | 78 |
| | Parallel light transmittance 2 (%) | | 47 | 49 | 81 | 83 | 79 | | 63 | 93 | 90 |
| | Total light transmittance 4 (%) | 85 | 83 | 77 | 80 | 80 | 81 | | 78 | | |
| | Haze (%) | 61 | 63 | 63 | 27 | 27 | 26 | | 58 | | |

Example 6

Figure 23:
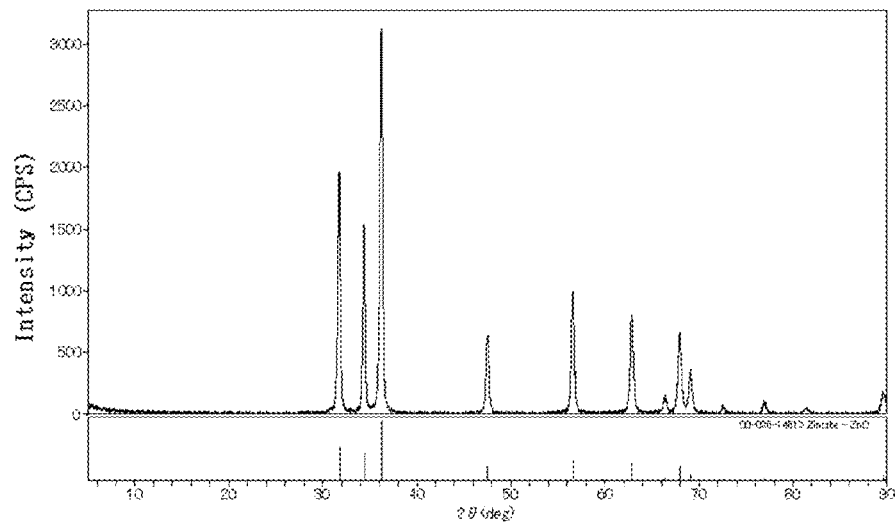
FIG. 23 is an X-ray diffraction spectrum of zinc oxide particles of the present invention obtained in Example 6.

In 1200 ml of an aqueous zinc acetate solution prepared by dissolving 66.51 g of zinc acetate dihydrate (zinc acetate manufactured by Hosoi Chemical Industry Co., Ltd.) in water so as to have a concentration of 0.25 mol/l in terms of zinc acetate dihydrate, 80 g of FINEX-50 (manufactured by Sakai Chemical Industry Co., Ltd., particle diameter: 0.02 µm) was repulped, thereby forming a slurry. Subsequently, the slurry was heated to 100° C. over 60 minutes with stirring, and aged at 100° C. for 7 hours with stirring. After aging, the slurry was filtered, and washed with water. Subsequently, the obtained solid was repulped in 3 liters of water to form a slurry, and the slurry was heated to 100° C. over 60 minutes with stirring, and heated and washed at 100° C. for 30 minutes with stirring. After heating and washing, the slurry was filtered, washed with water, and dried at 110° C. for 12 hours to obtain hexagonal prism-shaped zinc oxide particles having a primary particle diameter of 0.10 µm. The size and form of the obtained particles were observed with a transmission electron microscope (TEM, JEM-1200EX II, manufactured by JEOL Ltd.). The obtained electron microscope photograph is shown in FIG. 21. Further, an electron microscope photograph with a higher magnification is shown in FIG. 22. Further, the X-ray diffraction spectrum of the obtained particles is shown in FIG. 23. The results of evaluating the physical properties of the obtained particles and the physical properties of the coating film are shown in Table 2.

Example 7

Figure 24:
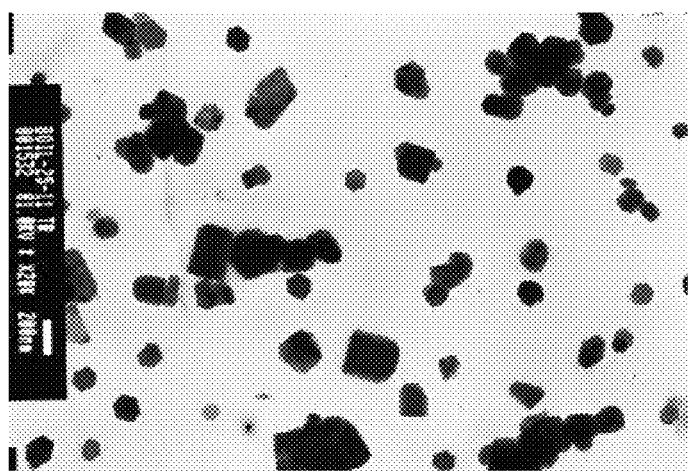
FIG. 24 is a transmission electron microscope photograph of zinc oxide particles of the present invention obtained in Example 7.
Figure 25:
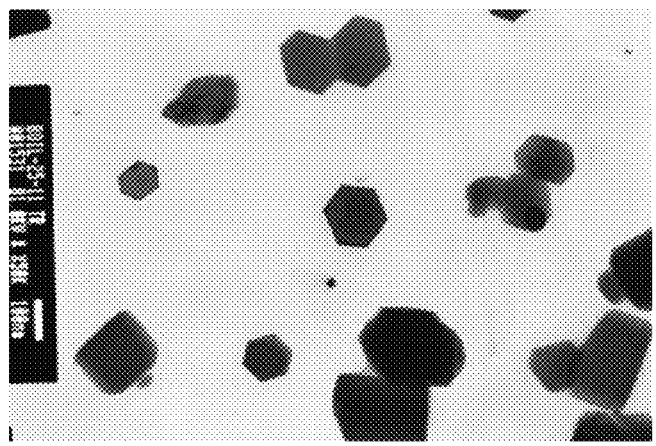
FIG. 25 is a transmission electron microscope photograph of zinc oxide particles of the present invention obtained in Example 7 which are observed with a higher magnification.

In 1200 ml of an aqueous zinc acetate solution prepared by dissolving 133.02 g of zinc acetate dihydrate (zinc acetate manufactured by Hosoi Chemical Industry Co., Ltd.) in water so as to have a concentration of 0.5 mol/l in terms of zinc acetate dihydrate, 80 g of SF-15 (manufactured by Sakai Chemical Industry Co., Ltd., particle diameter: 0.08 µm) was repulped, thereby forming a slurry. Subsequently, the slurry was heated to 70° C. over 42 minutes with stirring, and aged at 70° C. for 3 hours with stirring. After aging, the slurry was filtered, and washed with water. Subsequently, the obtained solid was repulped in 3 liters of water to form a slurry, and the slurry was heated to 70° C. over 42 minutes with stirring, and heated and washed at 70° C. for 30 minutes with stirring. After heating and washing, the slurry was filtered, washed with water, and dried at 110° C. for 12 hours to obtain hexagonal prism-shaped zinc oxide particles having a primary particle diameter of 0.19 µm. The size and form of the obtained particles were observed with a transmission electron microscope (TEM, JEM-1200EX II, manufactured by JEOL Ltd.). The obtained electron microscope photograph is shown in FIG. 24. Further, an electron microscope photograph with a higher magnification is shown in FIG. 25. The results of evaluating the physical properties of the obtained particles and the physical properties of the coating film are shown in Table 2.

Example 8

Figure 26:
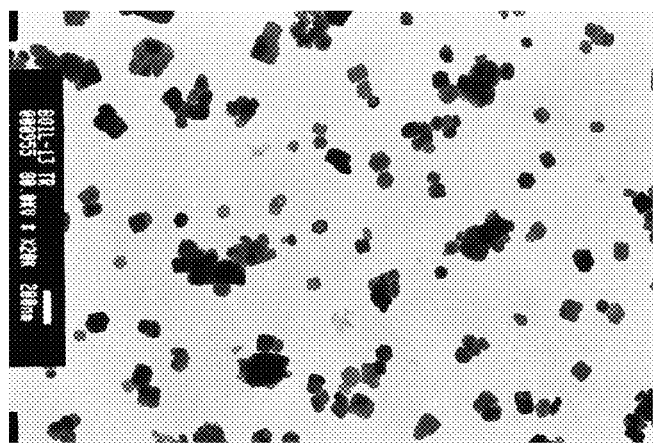
FIG. 26 is a transmission electron microscope photograph of zinc oxide particles of the present invention obtained in Example 8.
Figure 27:
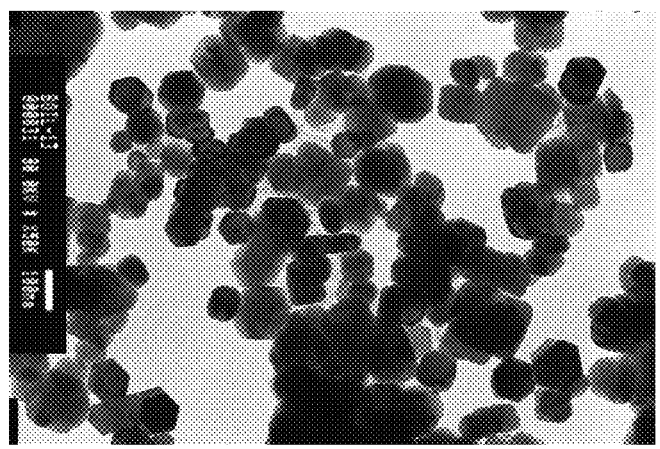
FIG. 27 is a transmission electron microscope photograph of zinc oxide particles of the present invention obtained in Example 8 which are observed with a higher magnification.
Figure 28:
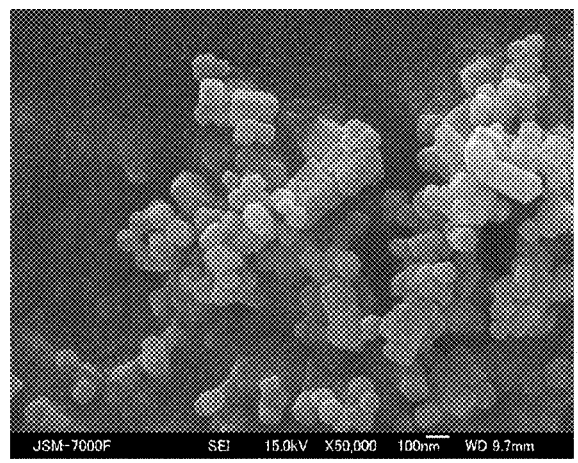
FIG. 28 is a scanning electron microscope photograph of zinc oxide particles of the present invention obtained in Example 8.
Figure 29:
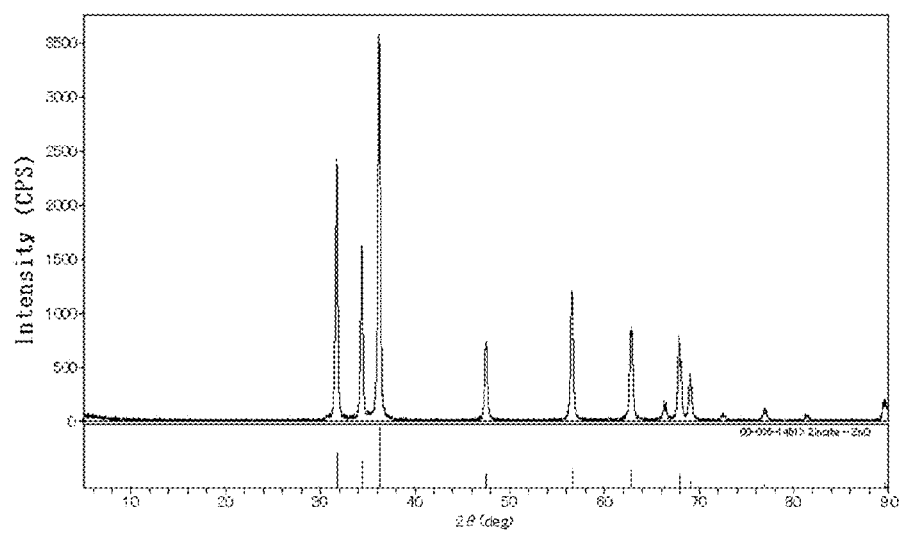
FIG. 29 is an X-ray diffraction spectrum of zinc oxide particles of the present invention obtained in Example 8.

In 1200 ml of an aqueous zinc acetate solution prepared by dissolving 106.42 g of zinc acetate dihydrate (zinc acetate manufactured by Hosoi Chemical Industry Co., Ltd.) in water so as to have a concentration of 0.4 mol/l in terms of zinc acetate dihydrate, 80 g of SF-15 (manufactured by Sakai Chemical Industry Co., Ltd., particle diameter: 0.08 µm) was repulped, thereby forming a slurry. Subsequently, the slurry was heated to 70° C. over 42 minutes with stirring, and aged at 70° C. for 5 hours with stirring. After aging, the slurry was filtered, and washed with water. Subsequently, the obtained solid was repulped in 3 liters of water to form a slurry, and the slurry was heated to 70° C. over 42 minutes with stirring, and heated and washed at 70° C. for 30 minutes with stirring. After heating and washing, the slurry was filtered, washed with water, and dried at 110° C. for 12 hours to obtain hexagonal prism-shaped zinc oxide particles having a primary particle diameter of 0.13 µm. The size and form of the obtained particles were observed with a transmission electron microscope (TEM, JEM-1200EX II, manufactured by JEOL Ltd.). The obtained electron microscope photograph is shown in FIG. 26. Further, an electron microscope photograph with a higher magnification is shown in FIG. 27. The size and form of the obtained particles were observed with a scanning electron microscope (SEM, JSM-7000F, manufactured by JEOL Ltd.). The obtained electron microscope photograph is shown in FIG. 28. Further, the X-ray diffraction spectrum of the obtained particles is shown in FIG. 29. The results of evaluating the physical properties of the obtained particles and the physical properties of the coating film are shown in Table 2.

Example 9

Figure 30:
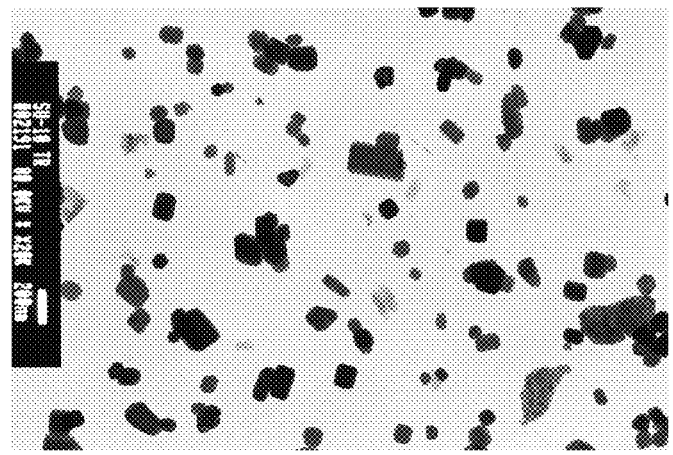
FIG. 30 is a transmission electron microscope photograph of zinc oxide particles of the present invention obtained in Example 9.
Figure 31:
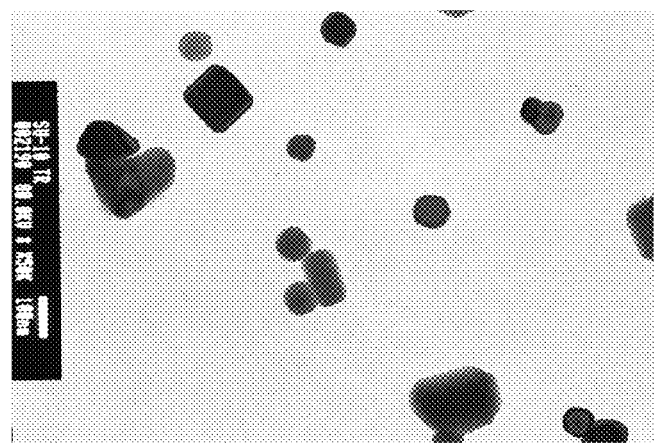
FIG. 31 is a transmission electron microscope photograph of zinc oxide particles of the present invention obtained in Example 9 which are observed with a higher magnification.

In 1200 ml of an aqueous zinc acetate solution prepared by dissolving 106.42 g of zinc acetate dihydrate (zinc acetate manufactured by Hosoi Chemical Industry Co., Ltd.) in water so as to have a concentration of 0.4 mol/l in terms of zinc acetate dihydrate, 80 g of SF-15 (manufactured by Sakai Chemical Industry Co., Ltd., particle diameter: 0.08 µm) was repulped, thereby forming a slurry. Subsequently, the slurry was heated to 90° C. over 54 minutes with stirring, and aged at 90° C. for 7 hours with stirring. After aging, the slurry was filtered, and washed with water. Subsequently, the obtained solid was repulped in 3 liters of water to form a slurry, and the slurry was heated to 90° C. over 54 minutes with stirring, and heated and washed at 90° C. for 30 minutes with stirring. After heating and washing, the slurry was filtered, washed with water, and dried at 110° C. for 12 hours to obtain hexagonal prism-shaped zinc oxide particles having a primary particle diameter of 0.15 µm. The size and form of the obtained particles were observed with a transmission electron microscope (TEM, JEM-1200EX II, manufactured by JEOL Ltd.). The obtained electron microscope photograph is shown in FIG. 30. Further, an electron microscope photograph with a higher magnification is shown in FIG. 31. The results of evaluating the physical properties of the obtained particles and the physical properties of the coating film are shown in Table 2.

Example 10

Figure 32:
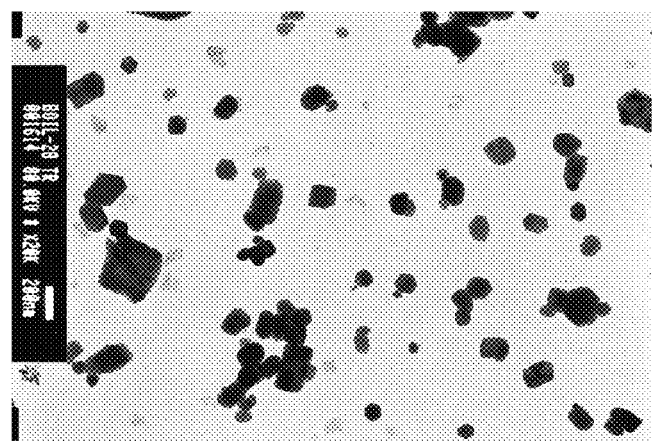
FIG. 32 is a transmission electron microscope photograph of zinc oxide particles of the present invention obtained in Example 10.
Figure 33:
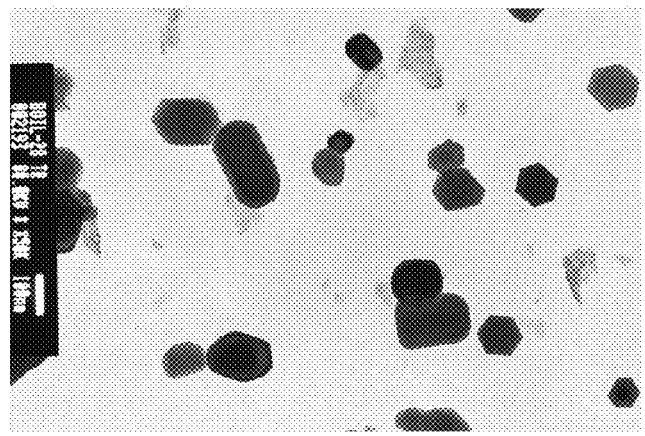
FIG. 33 is a transmission electron microscope photograph of zinc oxide particles of the present invention obtained in Example 10 which are observed with a higher magnification.

In 1200 ml of an aqueous zinc acetate solution prepared by dissolving 106.42 g of zinc acetate dihydrate (zinc acetate manufactured by Hosoi Chemical Industry Co., Ltd.) in water so as to have a concentration of 0.4 mol/l in terms of zinc acetate dihydrate, 80 g of FINEX-30 (manufactured by Sakai Chemical Industry Co., Ltd., particle diameter: 0.04 µm) was repulped, thereby forming a slurry. Subsequently, the slurry was heated to 70° C. over 42 minutes with stirring, and aged at 70° C. for 3 hours with stirring. After aging, the slurry was filtered, and washed with water. Subsequently, the obtained solid was repulped in 3 liters of water to form a slurry, and the slurry was heated to 70° C. over 42 minutes with stirring, and heated and washed at 70° C. for 30 minutes with stirring. After heating and washing, the slurry was filtered, washed with water, and dried at 110° C. for 12 hours to obtain hexagonal prism-shaped zinc oxide particles having a primary particle diameter of 0.11 μm. The size and form of the obtained particles were observed with a transmission electron microscope (TEM, JEM-1200EX II, manufactured by JEOL Ltd.). The obtained electron microscope photograph is shown in FIG. 32. Further, an electron microscope photograph with a higher magnification is shown in FIG. 33. The results of evaluating the physical properties of the obtained particles and the physical properties of the coating film are shown in Table 2.

Comparative Example 1

Fine zinc oxide (manufactured by Sakai Chemical Industry Co., Ltd., particle diameter: 0.11 μm) was evaluated in the same manner as in examples. The results of evaluating the physical properties of the obtained particles and the physical properties of the coating film are shown in Table 2.

Comparative Example 6

Figure 34:
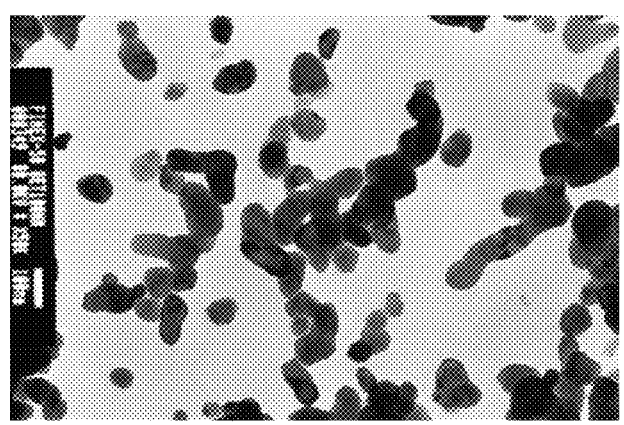
FIG. 34 is a transmission electron microscope photograph of zinc oxide particles obtained in Comparative Example 6.

In an alumina crucible (length/width/height=100 mm/100 mm/35 mm) was put 10 g of FINEX-50 (manufactured by Sakai Chemical Industry Co., Ltd., particle diameter: 0.02 μm), and left standing and calcinated at 525° C. for 2 hours in an electric muffle furnace (manufactured by TOYO ENGINEERING WORKS, LTD.) to obtain indefinite-shaped zinc oxide particles having a primary particle diameter of 0.10 μm. The size and form of the obtained particles were observed with a transmission electron microscope (TEM, JEM-1200EX II, manufactured by JEOL Ltd.). The obtained electron microscope photograph is shown in FIG. 34. The results of evaluating the physical properties of the obtained particles and the physical properties of the coating film are shown in Table 2.

Comparative Example 4

FINEX-50 (manufactured by Sakai Chemical Industry Co., Ltd., particle diameter: 0.02 μm) was evaluated in the same manner as in the examples. The results of evaluating the physical properties of the obtained particles and the physical properties of the coating film are shown in Table 2.

TABLE 2

| | | Example 6 | Example 7 | Example 8 | Example 9 | Example 10 | Compar. Ex. 1 | Compar. Ex. 6 | Compar. Ex. 4 |
|---|---|---|---|---|---|---|---|---|---|
| Preparation conditions | Zinc oxide fine particles as raw material | FINEX-50 | SF-15 | SF-15 | SF-15 | FINEX-30 | Fine zinc oxide | FINEX-50 | FINEX-50 |
| | Particle diameter of raw material (μm) | 0.02 | 0.08 | 0.08 | 0.08 | 0.04 | 0.11 | 0.02 | 0.02 |
| | Amount of raw material used in preparation (g) | 80 | 80 | 80 | 80 | 80 | | | |
| | Zinc salt used in preparation | Zinc acetate dihydrate | Zinc acetate dihydrate | Zinc acetate dihydrate | Zinc acetate dihydrate | Zinc acetate dihydrate | | | |
| | Amount of zinc salt (g) | 66.51 | 133.02 | 106.42 | 106.42 | 106.42 | | | |
| | Solvent used in preparation | Water | Water | Water | Water | Water | | | |
| | Amount of zinc salt solution (ml) | 1200 | 1200 | 1200 | 1200 | 1200 | | | |
| | Concentration of zinc salt solution (mol/l) | 0.25 | 0.5 | 0.4 | 0.4 | 0.4 | | | |
| | Aging temperature (° C.) | 100 | 70 | 70 | 90 | 70 | | | |
| | Aging time (Hr) | 7 | 3 | 5 | 7 | 3 | | | |
| | Calcinating temperature/calcinating time | | | | | | | 525° C./2 Hr | |
| Physical properties of particles | Composition of obtained particles | Zinc oxide | Zinc oxide | Zinc oxide | Zinc oxide | Zinc oxide | Zinc oxide | Zinc oxide | Zinc oxide |
| | Particle shape | Hexagonal prism shape | Hexagonal prism shape | Hexagonal prism shape | Hexagonal prism shape | Hexagonal prism shape | Indefinite shape | Indefinite shape | Indefinite shape |
| | Primary particle diameter (μm) | 0.10 | 0.19 | 0.13 | 0.15 | 0.11 | 0.11 | 0.10 | 0.02 |
| | D50 (μm) | 0.18 | 0.40 | 0.20 | 0.19 | 0.15 | 0.23 | 0.17 | 0.14 |
| | D90 (μm) | 0.24 | 0.54 | 0.25 | 0.27 | 0.21 | 0.41 | 0.37 | 0.41 |
| | D10 (μm) | 0.13 | 0.25 | 0.15 | 0.13 | 0.10 | 0.17 | 0.09 | 0.05 |
| | D90/D10 | 1.92 | 2.16 | 1.67 | 2.09 | 2.09 | 2.47 | 4.05 | 7.39 |
| | Aspect ratio | 1.4 | 1.6 | 1.2 | 1.4 | 1.3 | 2.1 | 1.9 | 1.8 |
| Physical properties of coating film | Total light transmittance 1 (%) | 14 | 20 | 12 | 16 | 15 | 20 | 15 | 15 |
| | Total light transmittance 2 (%) | 12 | 18 | 10 | 14 | 15 | 17 | 14 | 16 |
| | Total light transmittance 3 (%) | 15 | 23 | 10 | 11 | 15 | 19 | 18 | 54 |
| | Parallel light transmittance 1 (%) | 71 | 63 | 56 | 55 | 65 | 53 | 57 | 85 |
| | Parallel light transmittance 2 (%) | 90 | 85 | 81 | 80 | 86 | 79 | 81 | 93 |

Example 11

Figure 35:
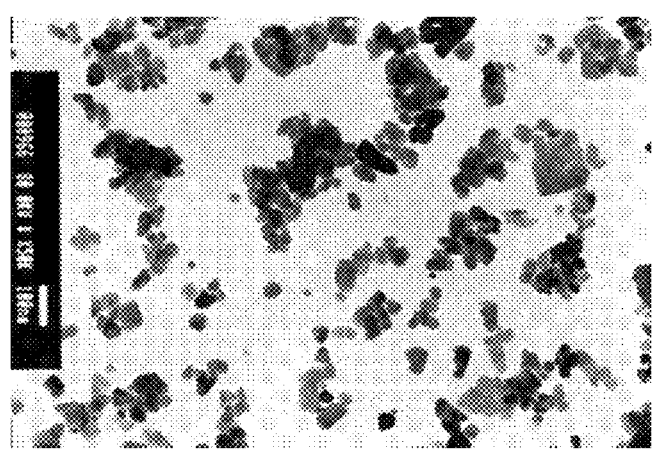
FIG. 35 is a transmission electron microscope photograph of zinc oxide particles of the present invention obtained in Example 11.
Figure 36:
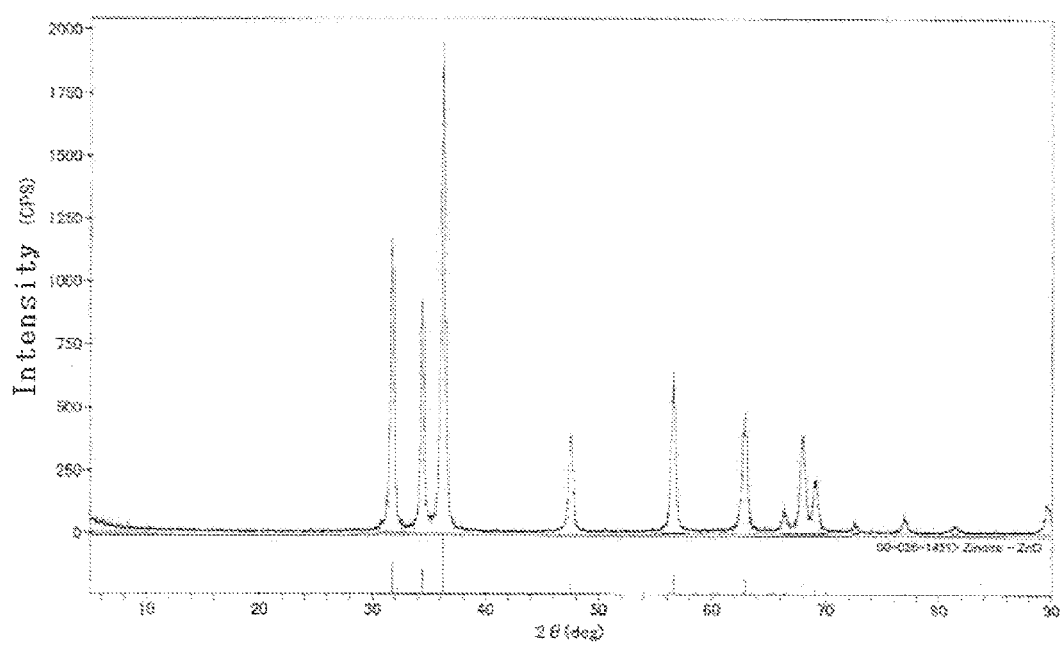
FIG. 36 is an X-ray diffraction spectrum of zinc oxide particles of the present invention obtained in Example 11.

In 1200 ml of an aqueous zinc acetate solution prepared by dissolving 66.51 g of zinc acetate dihydrate (zinc acetate manufactured by Hosoi Chemical Industry Co., Ltd.) in water so as to have a concentration of 0.25 mol/l in terms of zinc acetate dihydrate, 80 g of FINEX-50 (manufactured by Sakai Chemical Industry Co., Ltd., primary particle diameter: 0.02 μm) was repulped, thereby forming a slurry. Subsequently, the slurry was heated to 70° C. over 42 minutes with stirring, and aged at 70° C. for 3 hours with stirring. After aging, the slurry was filtered, and washed with water. Subsequently, the obtained solid was repulped in 3 liters of water to form a slurry, and the slurry was heated to 70° C. over 42 minutes with stirring, and heated and washed at 70° C. for 30 minutes with stirring. After heating and washing, the slurry was filtered, washed with water, and dried at 110° C. for 12 hours to obtain zinc oxide particles having a primary particle diameter of 0.046 μm. The size and form of the obtained particles were observed with a transmission electron microscope (TEM, JEM-1200EX II, manufactured by JEOL Ltd.). The obtained electron microscope photograph is shown in FIG. 35. Further, the X-ray diffraction spectrum of the obtained particles is shown in FIG. 36. The results of evaluating the physical properties of the obtained particles and the physical properties of the coating film are shown in Table 3.

Example 12

Figure 37:
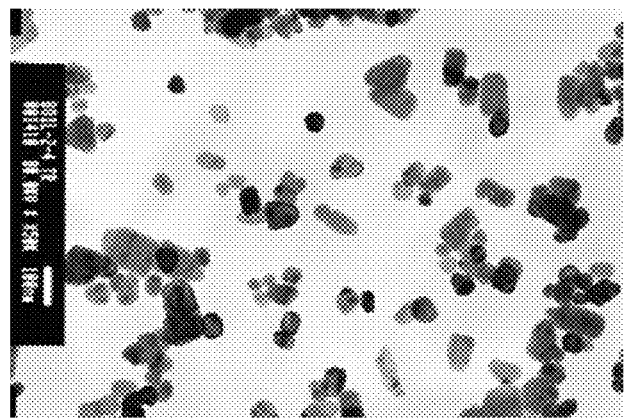
FIG. 37 is a transmission electron microscope photograph of zinc oxide particles of the present invention obtained in Example 12.

In 1200 ml of an aqueous zinc acetate solution prepared by dissolving 93.12 g of zinc acetate dihydrate (zinc acetate manufactured by Hosoi Chemical Industry Co., Ltd.) in water so as to have a concentration of 0.35 mol/l in terms of zinc acetate dihydrate, 80 g of FINEX-50 (manufactured by Sakai Chemical Industry Co., Ltd., primary particle diameter: 0.02 μm) was repulped, thereby forming a slurry. Subsequently, the slurry was heated to 90° C. over 54 minutes with stirring, and aged at 90° C. for 3 hours with stirring. After aging, the slurry was filtered, and washed with water. Subsequently, the obtained solid was repulped in 3 liters of water to form a slurry, and the slurry was heated to 90° C. over 54 minutes with stirring, and heated and washed at 90° C. for 30 minutes with stirring. After heating and washing, the slurry was filtered, washed with water, and dried at 110° C. for 12 hours to obtain zinc oxide particles having a primary particle diameter of 0.074 μm. The size and form of the obtained particles were observed with a transmission electron microscope (TEM, JEM-1200EX II, manufactured by JEOL Ltd.). The obtained electron microscope photograph is shown in FIG. 37. The results of evaluating the physical properties of the obtained particles and the physical properties of the coating film are shown in Table 3.

Example 13

Figure 38:
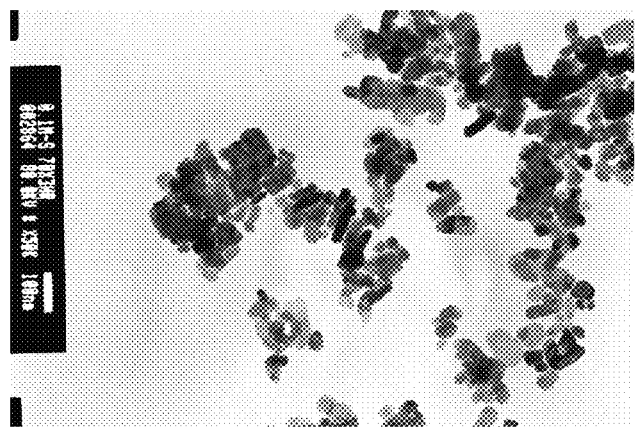
FIG. 38 is a transmission electron microscope photograph of zinc oxide particles of the present invention obtained in Example 13.

In 1200 ml of an aqueous zinc acetate solution prepared by dissolving 26.61 g of zinc acetate dihydrate (zinc acetate manufactured by Hosoi Chemical Industry Co., Ltd.) in water so as to have a concentration of 0.10 mol/l in terms of zinc acetate dihydrate, 80 g of FINEX-50 (manufactured by Sakai Chemical Industry Co., Ltd., primary particle diameter: 0.02 μm) was repulped, thereby forming a slurry. Subsequently, the slurry was heated to 70° C. over 84 minutes with stirring, and aged at 70° C. for 3 hours with stirring. After aging, the slurry was filtered, and washed with water. Subsequently, the obtained solid was repulped in 3 liters of water to form a slurry, and the slurry was heated to 70° C. over 84 minutes with stirring, and heated and washed at 70° C. for 30 minutes with stirring. After heating and washing, the slurry was filtered, washed with water, and dried at 110° C. for 12 hours to obtain zinc oxide particles having a primary particle diameter of 0.045 μm. The size and form of the obtained particles were observed with a transmission electron microscope (TEM, JEM-1200EX II, manufactured by JEOL Ltd.). The obtained electron microscope photograph is shown in FIG. 38. The results of evaluating the physical properties of the obtained particles and the physical properties of the coating film are shown in Table 3.

Comparative Example 5

FINEX-30 (manufactured by Sakai Chemical Industry Co., Ltd., primary particle diameter: 0.04 μm) was evaluated in the same manner as in the examples. The results of evaluating the physical properties of the obtained particles and the physical properties of the coating film are shown in Table 3.

Comparative Example 7

Figure 39:
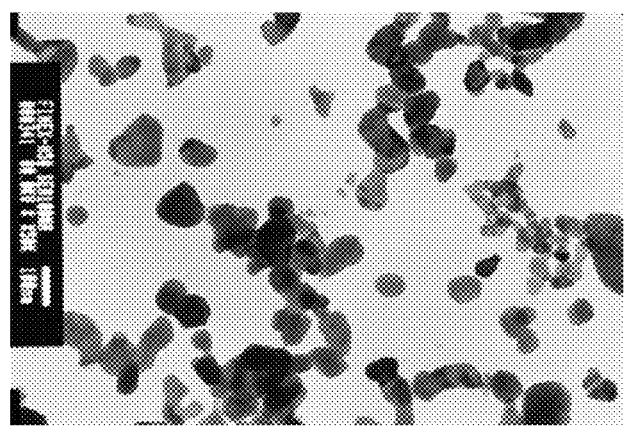
FIG. 39 is a transmission electron microscope photograph of zinc oxide particles obtained in Comparative Example 7.

In an alumina crucible (length/width/height=100 mm/100 mm/35 mm) was put 10 g of FINEX-50 (manufactured by Sakai Chemical Industry Co., Ltd., particle diameter: 0.02 μm), and left standing and calcinated at 500° C. for 2 hours in an electric muffle furnace (manufactured by TOYO ENGINEERING WORKS, LTD.) to obtain zinc oxide particles having a primary particle diameter of 0.083 μm. The size and form of the obtained particles were observed with a transmission electron microscope (TEM, JEM-1200EX II, manufactured by JEOL Ltd.). The obtained electron microscope photograph is shown in FIG. 39. The results of evaluating the physical properties of the obtained particles and the physical properties of the coating film are shown in Table 3.

TABLE 3

| | | Example 11 | Example 12 | Example 13 | Comparative Example 5 | Comparative Example 7 |
| --- | --- | --- | --- | --- | --- | --- |
| Preparation conditions | Zinc oxide fine particles as raw material | FINEX-50 | FINEX-50 | FINEX-50 | FINEX-30 | FINEX-50 |
| | Particle diameter of raw material (μm) | 0.02 | 0.02 | 0.02 | 0.04 | 0.02 |
| | Amount of raw material used in preparation (g) | 80 | 80 | 80 | | |
| | Zinc salt used in preparation | Zinc acetate dihydrate | Zinc acetate dihydrate | Zinc acetate dihydrate | | |
| | Amount of zinc salt (g) | 66.51 | 93.12 | 26.61 | | |
| | Solvent used in | Water | Water | Water | | |

TABLE 3-continued

|  |  | Example 11 | Example 12 | Example 13 | Comparative Example 5 | Comparative Example 7 |
|---|---|---|---|---|---|---|
|  | preparation |  |  |  |  |  |
|  | Amount of zinc salt solution (ml) | 1200 | 1200 | 1200 |  |  |
|  | Concentration of zinc salt solution (mol/l) | 0.25 | 0.35 | 0.10 |  |  |
|  | Aging temperature (° C.) | 70 | 90 | 70 |  |  |
|  | Aging time (Hr) | 3 | 3 | 3 |  |  |
|  | Calcinating temperature/ calcinating time |  |  |  |  | 500° C./2 Hr |
| Physical properties of particles | Composition of obtained particles | Zinc oxide | Zinc oxide | Zinc oxide | Zinc oxide | Zinc oxide |
|  | Primary particle diameter ($\mu$m) | 0.046 | 0.074 | 0.045 | 0.044 | 0.083 |
|  | Crystallite diameter ($\mu$m) | 0.036 | 0.057 | 0.032 | 0.031 | 0.054 |
|  | Crystallite diameter/ primary particle diameter | 0.78 | 0.77 | 0.71 | 0.70 | 0.65 |
|  | Aspect ratio | 1.3 | 1.4 | 1.4 | 2.0 | 1.8 |
|  | BET specific surface area (m$^2$/g) | 23.1 | 14.5 | 23.6 | 24.3 | 12.9 |
|  | Oil absorption (ml/100 g) | 26 | 18 | 27 | 43 | 34 |
|  | Oil absorption/BET specific surface area (ml/100 m$^2$) | 1.13 | 1.24 | 1.14 | 1.77 | 2.63 |
|  | Apparent density (g/ml) | 0.53 | 0.66 | 0.49 | 0.13 | 0.16 |
| Physical properties of coating film | Total light transmittance 1 (%) | 14 | 16 | 10 | 13 | 16 |
|  | Total light transmittance 2 (%) | 13 | 15 | 11 | 13 | 15 |
|  | Parallel light transmittance 1 (%) | 84 | 78 | 89 | 78 | 76 |
|  | Parallel light transmittance 2 (%) | 93 | 92 | 97 | 90 | 87 |
|  | Sharpened gloss (20° gloss) | 148 | 143 | 151 | 109 | 99 |

INDUSTRIAL APPLICABILITY

The method for production of zinc oxide particles of the present invention can be used as a production method of zinc oxide particles which can be used for various applications such as a cosmetic, a heat releasing filler, and so on.

The invention claimed is:

1. A method for production of zinc oxide particles, comprising a step of aging zinc oxide in an aqueous zinc salt solution, wherein the zinc salt solution consists of a zinc salt and water.

2. The method for production of zinc oxide particles according to claim 1, wherein a zinc salt concentration in the aqueous zinc salt solution is 0.005 mol/l or more and 4.00 mol/l or less.

3. The method for production of zinc oxide particles according to claim 1, wherein the zinc oxide has particle diameter of 0.005 $\mu$m or more and 0.5 $\mu$m or less.

4. The method for production of zinc oxide particles according to claim 1, comprising a step of surface treating the obtained zinc oxide particles.

5. The method for production of zinc oxide particles according to claim 2, wherein the zinc oxide has particle diameter of 0.005 $\mu$m or more and 0.5 $\mu$m or less.

6. The method for production of zinc oxide particles according to claim 5, comprising a step of surface treating the obtained zinc oxide particles.

7. The method for production of zinc oxide particles according to claim 2, comprising a step of surface treating the obtained zinc oxide particles.

8. The method for production of zinc oxide particles according to claim 3, comprising a step of surface treating the obtained zinc oxide particles.

9. A method for production of zinc oxide particles, comprising a step of aging a zinc oxide in an aqueous zinc salt solution, wherein the zinc salt solution consists of a zinc salt, water and a dispersant.

10. The method for production of zinc oxide particles according to claim 9, wherein a zinc salt concentration in the aqueous zinc salt solution is 0.005 mol/l or more and 4.00 mol/l or less.

11. The method for production of zinc oxide particles according to claim 9, wherein the zinc oxide has particle diameter of 0.005 $\mu$m or more and 0.5 $\mu$m or less.

12. The method for production of zinc oxide particles according to claim 9, comprising a step of surface treating the obtained zinc oxide particles.

13. The method for production of zinc oxide particles according to claim 10, wherein the zinc oxide has particle diameter of 0.005 $\mu$m or more and 0.5 $\mu$m or less.

14. The method for production of zinc oxide particles according to claim 13, comprising a step of surface treating the obtained zinc oxide particles.

15. The method for production of zinc oxide particles according to claim 10, comprising a step of surface treating the obtained zinc oxide particles.

16. The method for production of zinc oxide particles according to claim 11, comprising a step of surface treating the obtained zinc oxide particles.

* * * * *